(12) United States Patent
Cho et al.

(10) Patent No.: US 11,314,960 B2
(45) Date of Patent: Apr. 26, 2022

(54) DISPLAY APPARATUS INCLUDING LARGE-AREA FINGERPRINT SENSOR

(71) Applicant: LG Display Co., Ltd., Seoul (KR)

(72) Inventors: Ji-Ho Cho, Paju-si (KR); ManHyeop Han, Paju-si (KR); Yongkyun Choi, Paju-si (KR); Junghoon Lee, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

(21) Appl. No.: 16/913,977

(22) Filed: Jun. 26, 2020

(65) Prior Publication Data
US 2021/0019489 A1 Jan. 21, 2021

(30) Foreign Application Priority Data
Jul. 15, 2019 (KR) .................. 10-2019-0084952

(51) Int. Cl.
*G06K 9/00* (2006.01)
*G06F 3/041* (2006.01)

(52) U.S. Cl.
CPC .......... *G06K 9/0002* (2013.01); *G06F 3/0412* (2013.01)

(58) Field of Classification Search
None
See application file for complete search history.

(56) References Cited

U.S. PATENT DOCUMENTS

| 2013/0314343 | A1* | 11/2013 | Cho | ................. | G06F 3/04166 |
| | | | | | 345/173 |
| 2016/0132177 | A1* | 5/2016 | Bae | ................. | G06F 3/04166 |
| | | | | | 345/174 |
| 2017/0024597 | A1* | 1/2017 | Cho | ................. | G06F 3/04883 |
| 2017/0285846 | A1* | 10/2017 | Mizuhashi | ........... | G06F 3/0416 |
| 2020/0019804 | A1* | 1/2020 | Kim | ................. | G09G 3/32 |

FOREIGN PATENT DOCUMENTS

KR      10-1730835 B      4/2017

* cited by examiner

*Primary Examiner* — Matthew Yeung
(74) *Attorney, Agent, or Firm* — Polsinelli PC

(57) ABSTRACT

A display apparatus including a large-area fingerprint sensor includes a display panel displaying an image; a touch panel sensing a touch of a finger; a fingerprint sensor including a plurality of fingerprint pixels and recognizing a fingerprint of the finger; a fingerprint sensor driver driving the fingerprint sensor and including a driver driving the fingerprint sensor and a fingerprint recognizer recognizing a fingerprint by using sensing signals received from the fingerprint sensor; and a touch driver driving the touch panel, wherein the driver of the fingerprint sensor driver provides a sensing gate signal to sensing gate lines included in a first touch block determined being touched by touch position information received from the touch driver, among m (where m being an integer of 2 or greater) number of sensing gate lines included in the fingerprint sensor.

17 Claims, 11 Drawing Sheets

DISPLAY APPARATUS INCLUDING LARGE-AREA FINGERPRINT SENSOR

CROSS-REFERENCE TO RELATED APPLICATION

This application claims the benefit of the Korean Patent Application No. 10-2019-0084952 filed on Jul. 15, 2019, which is hereby incorporated by reference in its entirety.

BACKGROUND

Field of the Disclosure

The present disclosure relates to a display apparatus including a large-area fingerprint sensor.

Description of the Background

Fingerprint sensors are sensors for sensing fingerprints of persons. The fingerprint sensors have been generally used for locking devices such as door-lock, but recently, are being used to release a sleep mode of electronic devices such as smartphones and are being used as an authentication means for various applications provided by smartphones.

The fingerprint sensors may be categorized into an ultrasonic type, an infrared type, and a capacitive type on the basis of the operation principle thereof.

Particularly, fingerprint sensors using the ultrasonic type recognize a fingerprint by using a difference between voltages which are generated when ultrasonic waves generated by a plurality of piezoelectric elements are reflected by a ridge and a valley of the fingerprint.

A related art fingerprint sensor, for example, is provided in a partial region of an electronic device such as a smartphone. However, as various applications based on recognition of a fingerprint are provided by electronic devices, a size of each fingerprint senor needs to be equal to that of a display area of a display panel.

However, as sizes of fingerprint sensors increase, power consumption of the fingerprint sensors is increasing, and due to the increase in power consumption of the fingerprint sensors, power consumption of electronic devices such as smartphones is increasing.

SUMMARY

Accordingly, the present disclosure is to provide a display apparatus that substantially obviates one or more problems due to limitations and disadvantages of the prior art.

An aspect of the present disclosure is directed to providing a display apparatus including a large-area fingerprint sensor, which supplies a driving signal to only a first touch block corresponding to a position touched by a finger of a user to sense a fingerprint of the user.

Additional advantages and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these and other advantages and in accordance with the purpose of the disclosure, as embodied and broadly described herein, there is provided a display apparatus including a large-area fingerprint sensor, the display apparatus including a display panel displaying an image, a touch panel sensing a touch of a finger, a fingerprint sensor including a plurality of fingerprint pixels performing a function corresponding to a basic unit of recognizing a fingerprint of the finger, a fingerprint sensor driver driving the fingerprint sensor, and a touch driver driving the touch panel. The fingerprint sensor driver includes a driver driving the fingerprint sensor and a fingerprint recognizer recognizing a fingerprint by using sensing signals received from the fingerprint sensor. The driver provides a sensing gate signal to sensing gate lines, included in a first touch block determined to be touched based on touch position information received from the touch driver, among m (where m is an integer of 2 or more) number of sensing gate lines included in the fingerprint sensor.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain the principle of the disclosure.

In the drawings.

DETAILED DESCRIPTION

Figure 1:
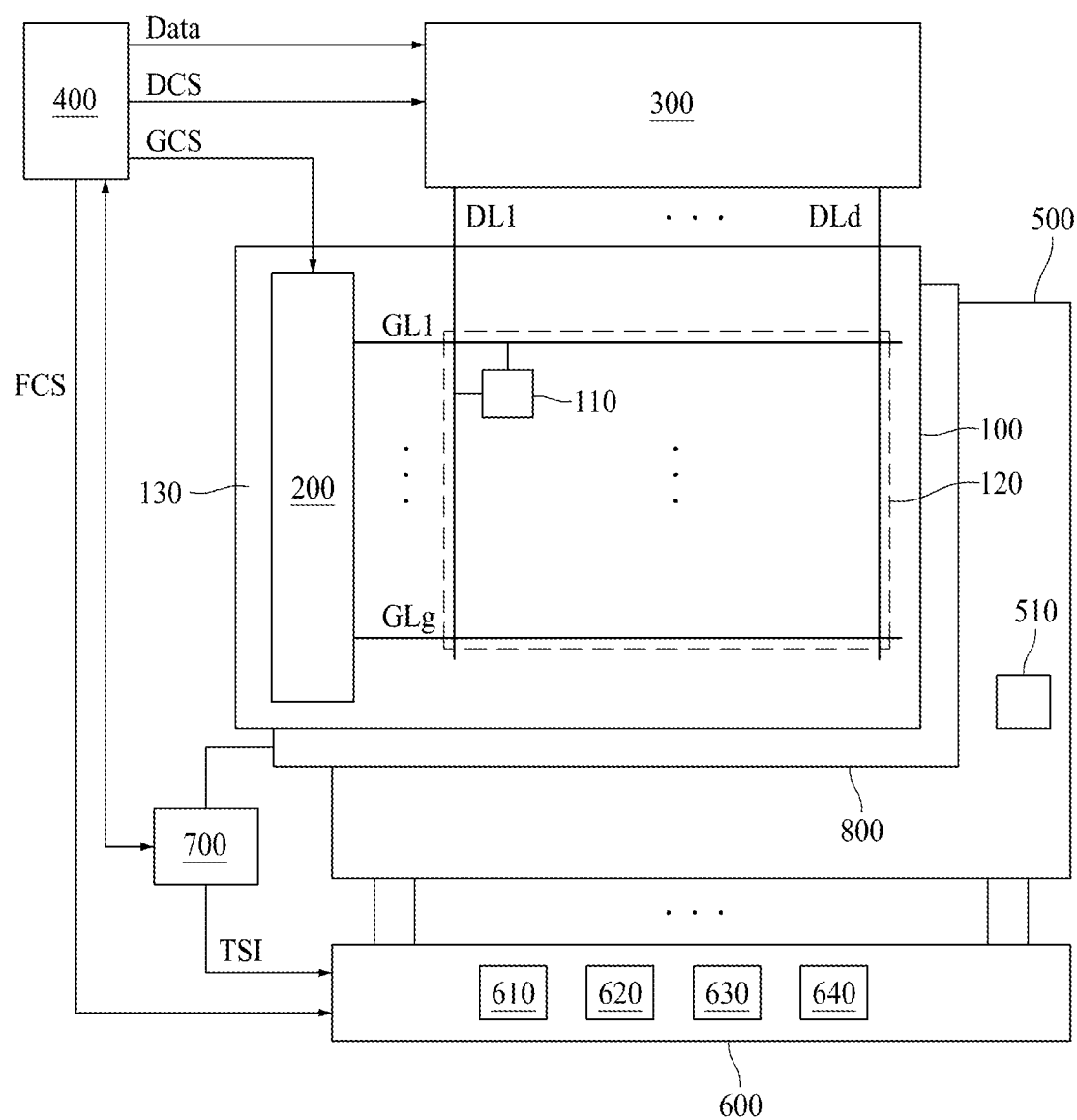
FIG. 1 is an exemplary diagram illustrating a configuration of a display apparatus including a large-area fingerprint sensor according to the present disclosure.

Reference will now be made in detail to the exemplary aspects of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following aspects described with reference to the accompanying drawings. The present disclosure may, however, be embodied in different forms and should not be construed as limited to the aspects set forth herein. Rather, these aspects are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing aspects of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. In a case where 'comprise', 'have', and 'include' described in the present specification are used, another part may be added unless 'only~' is used. The terms of a singular form may include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts may be disposed between the two parts unless 'just' or 'direct' is used.

In describing a time relationship, for example, when the temporal order is described as 'after~', 'subsequent~', 'next~', and 'before~', a case which is not continuous may be included unless 'just' or 'direct' is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing the elements of the present disclosure, terms such as first, second, A, B, (a), (b), etc., may be used. Such terms are used for merely discriminating the corresponding elements from other elements and the corresponding elements are not limited in their essence, sequence, or precedence by the terms. It will be understood that when an element or layer is referred to as being "on" or "connected to" another element or layer, it can be directly on or directly connected to the other element or layer, or intervening elements or layers may be present. Also, it should be understood that when one element is disposed on or under another element, this may denote a case where the elements are disposed to directly contact each other, but may denote that the elements are disposed without directly contacting each other.

The term "at least one" should be understood as including any and all combinations of one or more of the associated listed elements. For example, the meaning of "at least one of a first element, a second element, and a third element" denotes the combination of all elements proposed from two or more of the first element, the second element, and the third element as well as the first element, the second element, or the third element.

Features of various aspects of the present disclosure may be partially or overall coupled to or combined with each other, and may be variously inter-operated with each other and driven technically as those skilled in the art can sufficiently understand. The aspects of the present disclosure may be carried out independently from each other, or may be carried out together in co-dependent relationship.

Hereinafter, aspects of the present disclosure will be described in detail with reference to the accompanying drawings.

Figure 2:
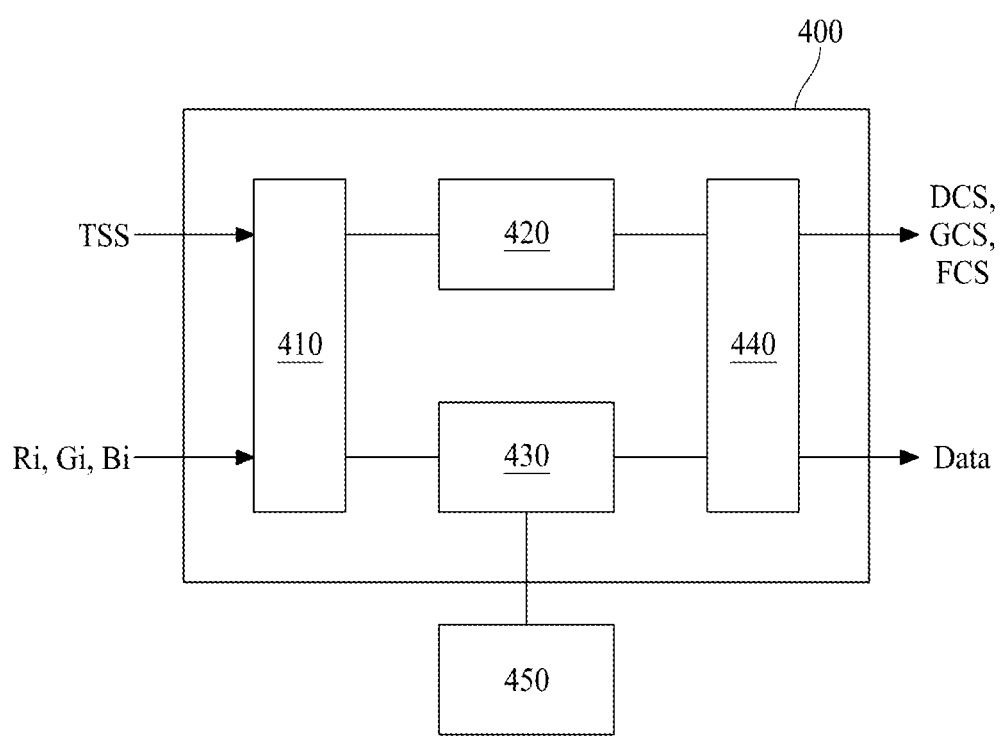
FIG. 2 is an exemplary diagram illustrating a configuration of a controller applied to a display apparatus including a large-area fingerprint sensor according to the present disclosure.

FIG. 1 is an exemplary diagram illustrating a configuration of a display apparatus including a large-area fingerprint sensor according to the present disclosure, and FIG. 2 is an exemplary diagram illustrating a configuration of a controller applied to the display apparatus including the large-area fingerprint sensor according to the present disclosure.

The display apparatus including the large-area fingerprint sensor according to the present disclosure, as illustrated in FIG. 1, may include a display panel 100 which displays an image, a touch panel 800 which senses a touch of a user, a touch driver 700 for driving the touch panel 800, a gate driver 200 for supplying gate signals to a plurality of gate lines GL1 to GLg included in the display panel 100, a fingerprint sensor 500 which includes a plurality of fingerprint pixels 510 for performing a function corresponding to a basic unit for recognizing a fingerprint of the user, a fingerprint sensor driver 600 for driving the fingerprint sensor 500, a data driver 300 for supplying data voltages to a plurality of data lines DL1 to DLd included in the display panel 100, and a controller 400 which converts pieces of input video data transmitted from an external system into pieces of image data, transmits the pieces of image data to the data driver 300, and generates a control signal for controlling the gate driver 200, the data driver 300, the touch driver 700, and the fingerprint sensor driver 600 by using timing synchronization signals transmitted from the external system.

Hereinafter, the elements will be sequentially described.

The display panel 100 may be a liquid crystal display panel including liquid crystal, an organic light emitting display panel including a plurality of organic light emitting diodes, or a light emitting display panel including a plurality of inorganic light emitting devices, and in addition, the display panel 100 may be one of various kinds of display panels.

The display panel 100 may include a display area 120, including a plurality of pixels 110 for displaying an image, and a non-display area 130 surrounding the display area 120.

The gate driver 200 for supplying the gate signals to a plurality of pixel driving circuits respectively provided in the plurality of pixels 110 may be provided in the non-display area 130.

The display apparatus including the large-area fingerprint sensor according to the present disclosure may include a touch panel 800 which is used to determine the presence of a touch and a touch position. The touch panel 800 may be implemented as one body integrated with the display panel 100, or may be manufactured independently from the display panel 100 and may be attached on the display panel 100.

The touch panel 800 may be manufactured by using various types such as a resistive type and a capacitive type. When the touch panel 800 uses the capacitive type, the touch panel 800 may be manufactured by using a mutual type which needs a plurality of touch driving electrodes and a plurality of touch receiving electrodes. When the touch panel 800 uses the capacitive type, the touch panel 800 may be manufactured by using a self-capacitive type which needs only a plurality of touch electrodes provided independently therefrom.

The touch driver 700 may supply a touch driving signal to the touch panel 800 and may generate information (hereinafter referred to as touch position information) about a touched position (hereinafter referred to as a touch position) of the touch panel 800 by using touch sensing signals received from the touch panel 800.

The touch driver 700 may transfer the touch position information to the fingerprint sensor driver 600.

The gate driver 200 may supply the gate signals to the pixel driving circuits.

The gate driver 200 may be provided in the non-display area 130, and in manufacturing the pixel driving circuits, the gate driver 200 may be manufactured along with the pixel driving circuits. That is, the gate driver 200 may be directly embedded into the display panel 100 by using a gate-in panel (GIP) type. However, the gate driver 200 may be manufactured independently from the display panel 100 and may be mounted in the non-display area 130.

The gate driver 200 may supply a gate-on signal to the gate lines GL1 to GLg included in the display panel 100 by using gate control signals GCS transferred from the controller 400. The gate control signals GCS may include a plurality of gate clocks.

Here, the gate-on signal may denote a signal for turning on a transistor connected to each of the gate lines GL1 to GLg. A signal for turning off the transistor may be referred to as a gate-off signal. A generic name for the gate-on signal and the gate-off signal may be a gate signal.

The data driver 300 may convert the pieces of image data Data transferred from the controller 400 into data voltages and may provide the data voltages to the data lines DL1 to DLd.

The controller 400 may generate the gate control signals GCS for controlling driving of the gate driver 200 and data control signals DCS for controlling driving of the data driver 300 by using timing synchronization signals TSS input from the external system. Also, the controller 400 may convert pieces of input video data Ri, Gi, and Bi received from the external system into the pieces of image data Data and may transfer the pieces of image data Data to the data driver 300.

As described above, the display apparatus including the large-area fingerprint sensor according to the present disclosure may include the touch driver 700 for sensing the presence of a touch applied to the touch panel 800 by using the touch sensing signals received from the touch panel 800, and the controller 400 may generate touch control signals for controlling the touch driver 700.

Moreover, the controller 400 may generate a fingerprint sensor control signal FCS for controlling the fingerprint sensor driver 600.

In order to perform the above-described function, as illustrated in FIG. 2, the controller 400 may include a data aligner 430 which realigns the pieces of input video data Ri, Gi, and Bi transferred from the external system by using the timing synchronization signals TSS transferred from the external system to provide pieces of realigned image data to the data driver 300, a control signal generator 420 which generates the gate control signal GCS, the data control signal DCS, the touch control signal, and the fingerprint sensor control signal FCS by using the timing synchronization signals TSS, an input unit 410 which transfers the timing synchronization signals TSS and the pieces of input video data Ri, Gi, and Bi, transmitted from the external system, to the data aligner 430 and the control signal generator 420, and an output unit 440 which outputs the pieces of image data and the control signals, respectively generated by the data aligner 430 and the control signal generator 420, to the data driver 300, the gate driver 200, the fingerprint sensor driver 600, or the touch driver 700.

Moreover, the controller 400 may further include a storage unit 450 which stores pieces of information needed for controlling the gate driver 200, the data driver 300, the fingerprint sensor driver 600, and the touch driver 700 and at least one of the input video data Ri, Gi, and Bi and the image data Data. However, the storage unit 450 may be configured independently from the controller 400.

The fingerprint sensor 500 may include a driving electrode unit which generates an ultrasonic wave, a plurality of receiving electrodes which receive an ultrasonic wave reflected by a fingerprint of a finger, and a piezoelectric material disposed between the driving electrode unit and the receiving electrodes. The piezoelectric material may denote a material representing a piezoelectric effect, and for example, may denote a material such as quartz, Rochelle salt, or barium titanate.

The fingerprint pixels 510 used as a basic unit for recognizing a fingerprint may be included in the fingerprint sensor 500.

A plurality of sensing gate lines connected to transistors included in the fingerprint pixels 510 may be included in the fingerprint sensor 500.

The fingerprint sensor 500 may be provided in a region corresponding to a portion of the display area 120, but may be implemented to have the same size as that of the display area 120.

The fingerprint sensor driver 600 may supply driving signals to the driving electrode unit and may supply sensing gate signals to the sensing gate lines.

The fingerprint sensor driver 600 may include a driver 610 for driving the driving electrode unit and a fingerprint recognizer 620 for recognizing a fingerprint by using sensing signals received from the fingerprint sensor 500. Also, the fingerprint sensor driver 600 may further include a power supply 640 for supplying power needed for the driver 610 and the fingerprint recognizer 620 and a storage unit 630 for storing a fingerprint (hereinafter referred to as a reference fingerprint) input by a user.

The power supply 640 may be provided outside the fingerprint sensor driver 600 independently from the fingerprint sensor driver 600.

Configurations and functions of the fingerprint sensor 500 and the fingerprint sensor driver 600 will be described below in detail with reference to the accompanying drawings.

Figure 3:
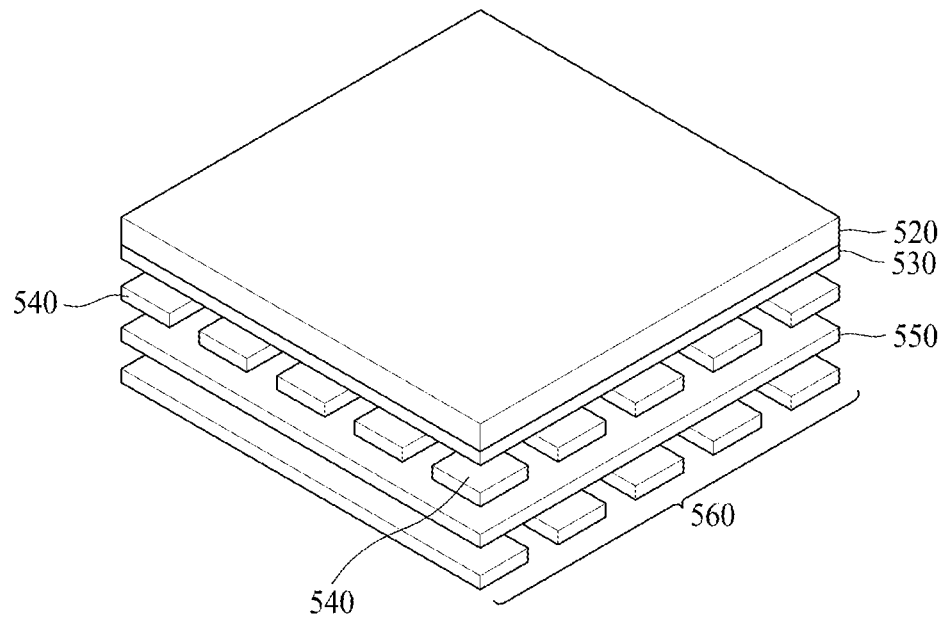
FIG. 3 is an exemplary diagram illustrating a structure of a fingerprint sensor applied to a display apparatus including a large-area fingerprint sensor according to the present disclosure.
Figure 4:
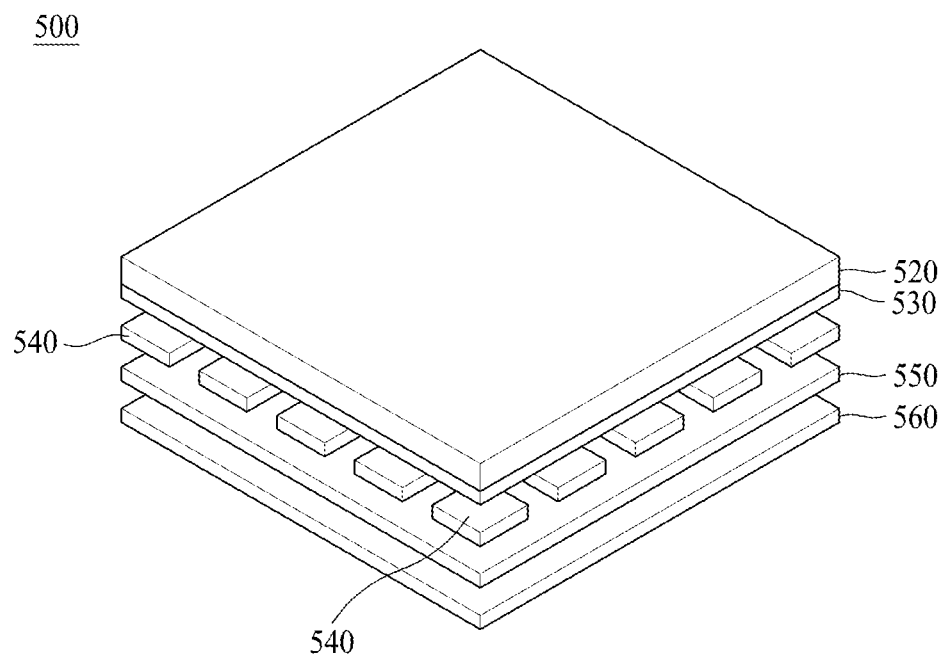
FIG. 4 is another exemplary diagram illustrating a structure of a fingerprint sensor applied to a display apparatus including a large-area fingerprint sensor according to the present disclosure.

FIG. 3 is an exemplary diagram illustrating a structure of a fingerprint sensor applied to a display apparatus including a large-area fingerprint sensor according to the present disclosure, and FIG. 4 is another exemplary diagram illustrating a structure of a fingerprint sensor applied to a display apparatus including a large-area fingerprint sensor according to the present disclosure.

A fingerprint sensor 500 applied to the present disclosure, as illustrated in FIGS. 3 and 4, may include a base substrate 520 and a plurality of transistors included in the fingerprint pixels 510, and moreover, may include a fingerprint pixel driving layer 530 provided in the base substrate 520, a plurality of receiving electrodes 540 provided on the fingerprint pixel driving layer 530 and in each of the fingerprint pixels 510, a plate-type piezoelectric material 550 provided at an upper end of each of the receiving electrodes 540, and a driving electrode unit 560 provided on the piezoelectric material 550.

The base substrate 520 may be a glass substrate, or may be a film including a synthetic resin.

The fingerprint pixel driving layer 530 may include a plurality of transistors.

Each of the receiving electrodes 540 may be connected to a gate of a first transistor included in each of the fingerprint pixels 510. The first transistor may be included in the fingerprint pixel driving layer 530.

The receiving electrodes 540 may receive an ultrasonic wave which are output from the driving electrode unit 560 and are received by a finger of a user and may provide the gate of the first transistor with a voltage (hereinafter referred to as an ultrasonic voltage) generated from the received ultrasonic wave.

The piezoelectric material 550 may generate an ultrasonic wave from voltages provided to the driving electrode unit 560 and the receiving electrodes 540 and may generate the ultrasonic voltage from an ultrasonic wave which is reflected by the finger of the user and is received by the receiving electrode 540. As described above, the piezoelectric material 550 may use quartz, Rochelle salt, or barium titanate.

The driving electrode unit 560, as illustrated in FIG. 3, may include a plurality of driving electrodes each having a rod shape. In this case, the driving electrodes may be provided with driving signals from the fingerprint sensor driver 600 by using various methods.

However, as illustrated in FIG. 4, the driving electrode unit 560 may be configured with one driving electrode having a plate shape.

Figure 5:
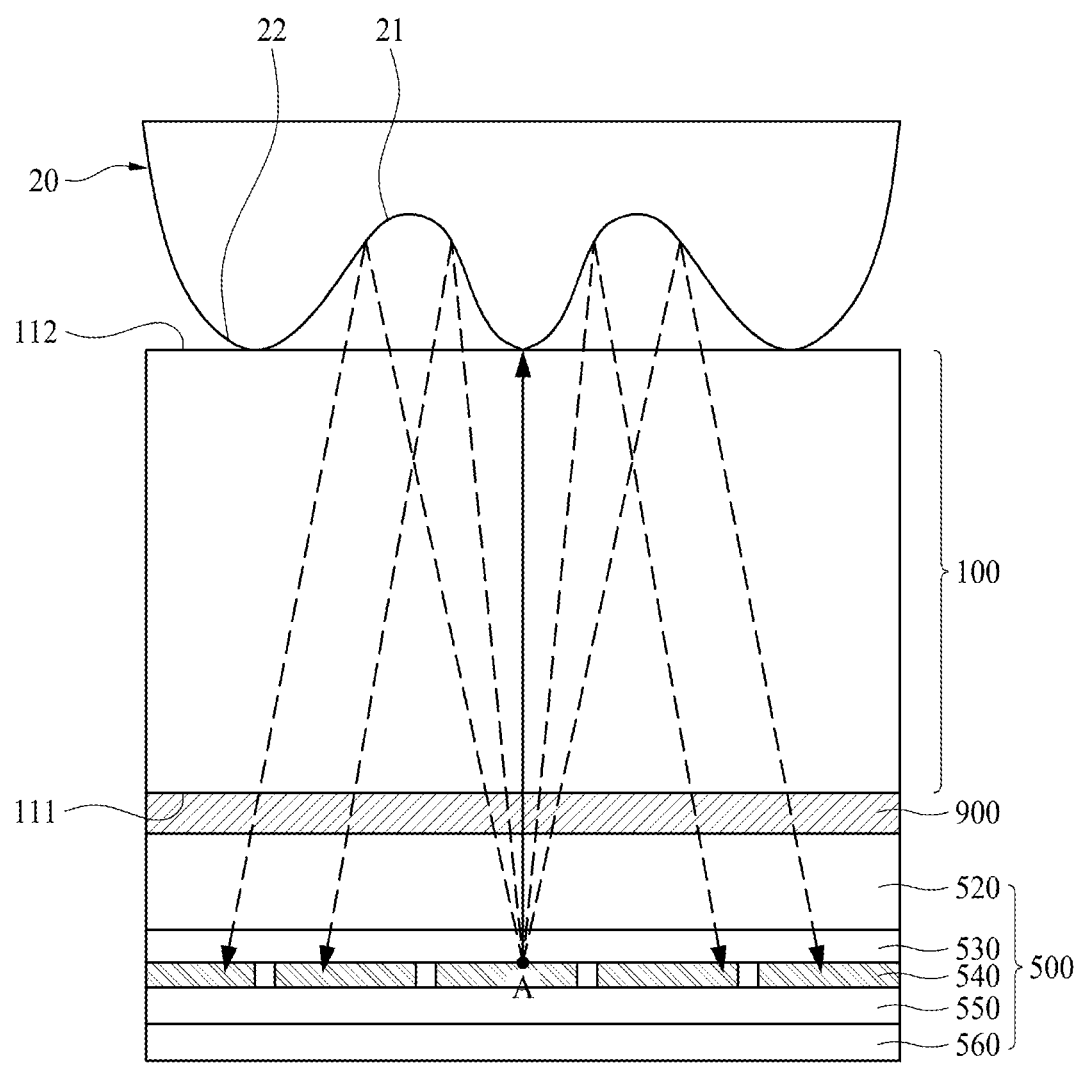
FIG. 5 is an exemplary diagram for describing the operation principle of a fingerprint sensor applied to a display apparatus including a large-area fingerprint sensor according to the present disclosure.

FIG. 5 is an exemplary diagram for describing the operation principle of a fingerprint sensor applied to a display apparatus including a large-area fingerprint sensor according to the present disclosure.

In the fingerprint sensor 500, as described above, the fingerprint pixel driving layer 530 may be provided on the base substrate 520, the receiving electrodes 540 may be provided on the fingerprint pixel driving layer 530, the piezoelectric material 550 may be provided on the receiving electrodes 540, and the driving electrode unit 560 may be provided on the piezoelectric material 550.

In this case, a second surface opposite to a first surface with the fingerprint pixel driving layer 530 provided thereon among both surfaces of the base substrate 520 configuring the fingerprint sensor 500 may be bonded to a first surface 111 of display panel 100, and an image may be displayed through a second surface 112 opposite to the first surface 111 among both surfaces of the display panel 100. A finger of a user for fingerprint recognition may contact the second surface 112 of the display panel 100.

The display panel 100, as described above, may be a liquid crystal display panel, an organic light emitting display panel, or a light emitting display panel including a plurality of inorganic light emitting devices, and in addition, the display panel 100 may be one of various kinds of display panels.

Moreover, the display panel 100 may include a touch panel 800 for sensing a touch position touched by the user. In this case, the touch panel 800 may be provided as one body integrated with the display panel 100, or may be attached on the display panel 100. Also, the touch panel 800 may be configured based on various types such as a self-capacitive type and a mutual type.

When the fingerprint sensor driver 600 supplies a driving signal to the driving electrode unit 560, an ultrasonic wave may be generated by the piezoelectric material 550, and as illustrated in FIG. 5, the ultrasonic wave may be transferred to the outside of the display panel 100 through the base substrate 520 and the display panel 100.

A fingerprint may be formed in a finger 20 of a user and may include valleys 21 and ridges 22. The valley 21 and the ridge 22 may have a height difference therebetween, and moreover, the valley 21 and the ridge 22 may be disposed with an inclined surface therebetween.

An ultrasonic voltage, generated by the receiving electrode 540 by using an ultrasonic wave which is output by the fingerprint sensor 500 and is received by the valley 21, and an ultrasonic voltage generated by the receiving electrode 540 by using an ultrasonic wave reflected by the ridge 22 may have different values.

Therefore, the fingerprint sensor driver 600 may recognize a fingerprint by using the ultrasonic voltage generated through the receiving electrode 540.

In this case, an ultrasonic wave generated at a first point A of the fingerprint sensor 500 may travel in only a direction vertical to the second surface 112 of the display panel 100 and then may not be reflected in only the direction vertical to the second surface 112. That is, as illustrated in FIG. 5, the ultrasonic wave generated at the first point A may travel in various directions inclined with respect to the second surface 112, and thus, may reach the receiving electrode 540 in the various directions inclined with respect to the second surface 112.

Therefore, ultrasonic waves received by the receiving electrode 540 corresponding to the first point A may include ultrasonic waves generated at points other than the first point A, in addition to the ultrasonic wave generated at the first point A. In this case, a period for which an ultrasonic wave generated at the first point A is reflected and received may differ from a period for which ultrasonic waves generated at points other than the first point A are received by the first point A.

In the present disclosure, a fingerprint may be recognized based on a period difference described above.

Hereinafter, a basic configuration of the fingerprint sensor 500 applied to the present disclosure and a basic method of sensing a fingerprint by using the fingerprint sensor 500 will be described.

Figure 6:
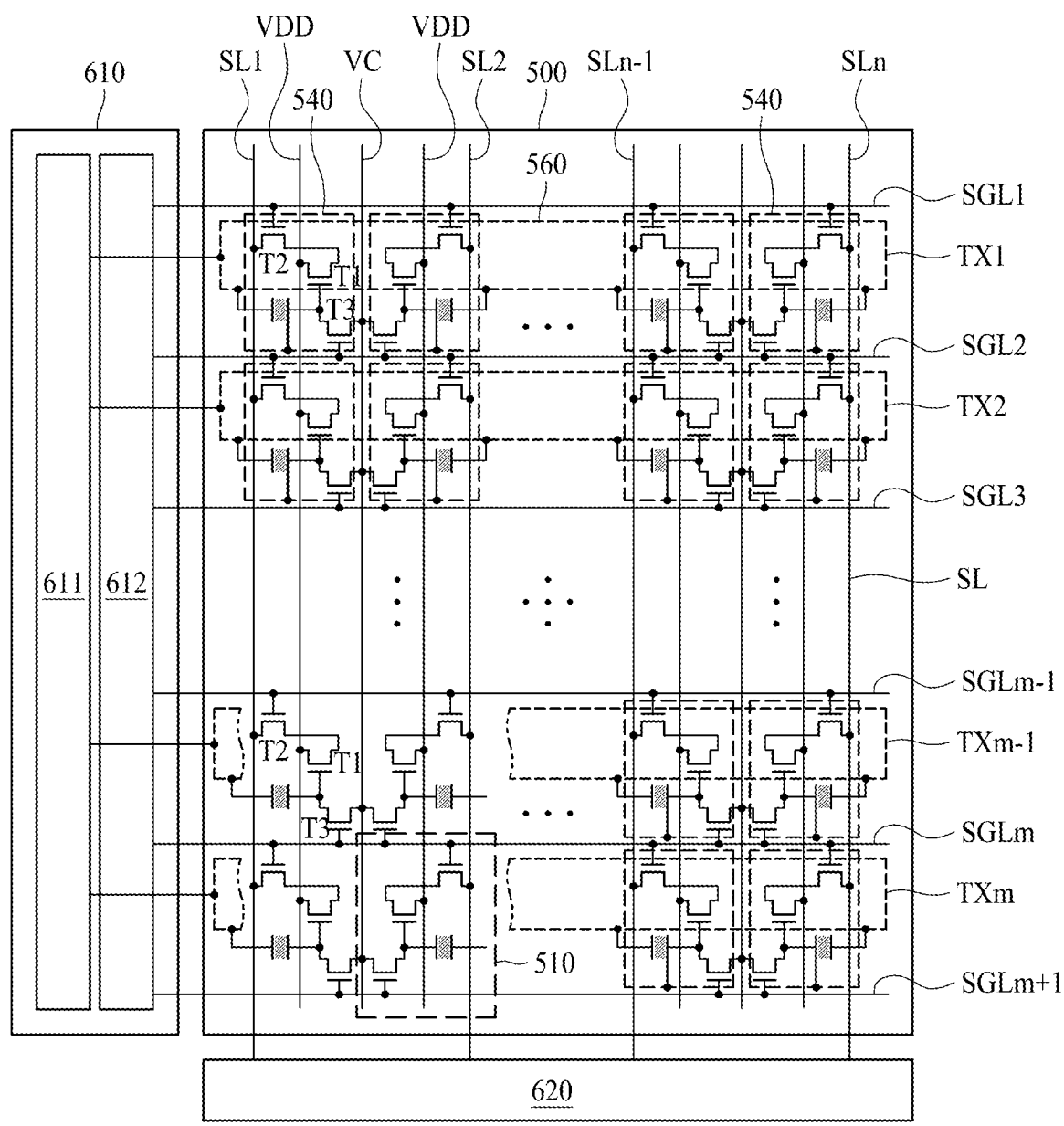
FIG. 6 is an exemplary diagram illustrating a configuration of a fingerprint sensor applied to a display apparatus including a large-area fingerprint sensor according to the present disclosure.

FIG. 6 is an exemplary diagram illustrating a configuration of a fingerprint sensor applied to a display apparatus including a large-area fingerprint sensor according to the present disclosure. Particularly, in a fingerprint sensor 500 illustrated in FIG. 6, in order to help understand a structure of a fingerprint pixel 510, a plurality of driving electrodes TXm−1 and TXm and a plurality of receiving electrodes 540 are not illustrated in a plurality of fingerprint pixels illustrated at a lower left portion of the fingerprint sensor 500, and all elements are illustrated in a plurality of fingerprint pixels 510 illustrated at an upper left portion, an upper right portion, and a lower right portion of the fingerprint sensor 500.

The fingerprint sensor 500, as illustrated in FIG. 6, may include the receiving electrodes 540 provided independently from each of the fingerprint pixels 510, n (where n is an integer of 2 or more) number of sensing lines SL which extend in a first direction and are connected to fingerprint pixels provided in the first direction, m (where m is an integer of 2 or more) number of driving electrodes TX1 to TXm which extend in a second direction differing from the first direction, m+1 number of sensing gate lines SGL1 to SGLm+1 which extend in the second direction, a plurality of fixed voltage lines VDD which extend in the first direction, a plurality of fingerprint common voltage lines VC which extend in the first direction, and three transistors T1 to T3 which are formed by one sensing line SL and one sensing gate line SGL and are included in the fingerprint pixel 510.

In the present disclosure, as described above with reference to FIGS. 3 and 4, the driving electrode unit 560 may include the driving electrodes TX1 to TXm each having a rod shape, or may be configured as one driving electrode having a plate shape. Hereinafter, for convenience of description, as illustrated in FIGS. 3 and 6, the fingerprint sensor 500 including the driving electrode unit 560 including the driving electrodes TX1 to TXm each having a rod shape will be described as an example of the present disclosure. However, below-given descriptions may be similarly applied to a fingerprint sensor 500 including a driving electrode unit 560 including only one driving electrode having a plate shape. Therefore, features of a fingerprint sensor 500 including a driving electrode unit 560 including only one driving electrode will be individually described.

As described above, the three transistor (for example, first to third transistors) T1 to T3 may be included in the fingerprint pixel 510.

A gate of the first transistor T1 of the three transistor T1 to T3 may be connected to a receiving electrode 540 corresponding to the fingerprint pixel 510, a first terminal thereof may be connected to the fixed voltage line VDD, and a second terminal thereof may be connected to a second terminal of the second transistor T2.

A gate of the second transistor T2 of the three transistors T1 to T3 may be connected to the sensing gate line SGL, a first terminal thereof may be connected to the sensing line SL, and a second terminal thereof may be connected to the second terminal of the first transistor T1.

A gate of the third transistor T3 of the three transistors T1 to T3 may be connected to another sensing gate line SGL adjacent to the sensing gate line, a first terminal thereof may be connected to the gate of the first transistor T1, and a second terminal thereof may be connected to a fingerprint common voltage line VC corresponding thereto.

In this case, the driving electrodes TX1 to TXm may be electrically connected to the fingerprint pixels 510 provided in parallel with the driving electrodes TX1 to TXm, respectively. When the driving electrode unit 560 is configured with one driving electrode, the one driving electrode may be electrically connected to all of the fingerprint pixels 510 included in the fingerprint sensor 500.

The fingerprint sensor driver 600 may include a driver 610, which supplies the driving signals to the driving electrodes TX1 to TXm and supplies the sensing gate signals to the sensing gate lines SGL1 to SGLm, and a fingerprint recognizer 620 which recognizes a fingerprint by using sensing signals received through the sensing lines SL1 to SLn.

The driver 610 may include a driving signal provider 611 for supplying the driving signals to the driving electrodes TX1 to TXm and a sensing gate signal provider 612 for supplying the sensing gate signals to the sensing gate lines SGL1 to SGLm.

The fingerprint recognizer 620, for example, may amplify a sensing signal received through each of the sensing lines SL1 to SLm, convert an amplified sensing signal into a digital value, recognize a valley, a ridge, and an inclined surface (hereinafter referred to as fingerprint information) of a fingerprint on the basis of a magnitude of the digital value, and combine pieces of fingerprint information recognized based on all sensing signals to finally recognize the fingerprint.

A receiving electrode driver for supplying a receiving electrode voltage to the receiving electrodes 540 or for floating the receiving electrodes 540 may be included in the driver 610, or may be included in the fingerprint recognizer 620. The receiving electrode voltage may be a ground voltage, or may be a predetermined voltage. To this end, each of the receiving electrodes 540 may be connected to the receiving electrode driver through a receiving electrode line corresponding thereto. However, when the receiving electrodes 540 are maintained in only a floating state, the receiving electrode driver may not be provided.

A basic method of sensing a fingerprint by using the fingerprint sensor 500 having the above-described structure will be described below.

First, in a state where the receiving electrode voltage is supplied to the receiving electrodes 540 or the receiving electrodes 540 are floated, the driving signal provider 611 may supply the driving signal to a first driving electrode TX1 provided in parallel with a first sensing gate line SGL1 during a predetermined period.

In this case, a sensing gate-off signal may be provided to all of the sensing gate lines SGL1 to SGLm including the first sensing gate line SGL1.

Here, the sensing gate-off signal may denote a signal which turns off transistors connected to the sensing gate line, and a signal for turning on the transistors connected to the sensing gate line may be referred to as a sensing gate-on signal. A generic name for the sensing gate-off signal and the sensing gate-on signal may be a sensing gate signal.

Therefore, while the driving signal is being supplied to the first driving electrode TX1, the second transistors T2 may be turned off, and thus, a sensing signal may not be transferred to the sensing lines SL1 to SLn connected to the second transistors T2.

Subsequently, after the driving signal is supplied, the receiving electrodes 540 may be floated or may be supplied with another voltage.

Subsequently, the receiving electrodes 540 may generate voltages (i.e., ultrasonic voltages) having different levels on the basis of an ultrasonic wave which is output from the first driving electrode TX1, reflected by a finger, and received by the receiving electrodes 540.

Each of the receiving electrodes 540 may be connected to a gate of the first transistor T1 included in the fingerprint pixel 510. As described above, the ultrasonic voltage generated through the receiving electrode 540 may vary based on a level of the ultrasonic wave received by the receiving electrode 540.

A level of a current passing through the first transistor T1 and a level of a voltage applied to the first transistor T1 may vary based on a level of an ultrasonic wave provided to the gate of the first transistor T1 through the receiving electrode 540.

In this case, the sensing gate-on signal may be provided to only the first sensing gate line SGL1, the sensing gate-off signal may be provided to the other sensing gate lines SGL2 to SGLm, and a voltage having a constant level may be provided to the fixed voltage line VDD.

Therefore, third transistors T3 configuring fingerprint pixels 510 provided along the first sensing gate line SGL1 may all be turned off, and all of second transistors T2 of the fingerprint pixels 510 may be turned on.

Therefore, a level of a current or a level of a voltage transferred to the fingerprint recognizer 620 through the sensing line SL may vary based on a level of a voltage provided to the gate of the first transistor T1.

The fingerprint recognizer 620 may generate pieces of fingerprint information respectively corresponding to the fingerprint pixels 510 provided along the first sensing gate line SGL1, based on a level of a current or a level of a voltage transferred through each of the sensing lines SL1 to SLn.

For example, an ultrasonic voltage generated from an ultrasonic wave received by the receiving electrode 540 included in the fingerprint pixel 510 may be provided to a gate of a first transistor T1 of a fingerprint pixel 510 connected to the first sensing line SL1 among the fingerprint pixels 510 provided along the first sensing gate line SGL1.

When the ultrasonic voltage does not turn on the first transistor T1, a current and a voltage may not be provided to the first sensing line SL1. Such a state may be recognized as a valley or a ridge by the fingerprint recognizer 620.

When the ultrasonic voltage turns on the first transistor T1, a current may flow from the first transistor T1 to the second transistor T2 on the basis of a fixed voltage applied through the fixed voltage line VDD. In this case, the second transistor T2 may be turned on by the sensing gate-on signal provided through the first sensing gate line SGL1, and thus, a current transferred from the first transistor T1 may be provided to the fingerprint recognizer 620 through the second transistor T2 and the first sensing line SL1.

Moreover, when the ultrasonic voltage turns on the first transistor T1, a constant voltage may be generated in the first transistor T1, and a voltage corresponding to a difference between the fixed voltage and a voltage applied to the first transistor T1 may be provided to the fingerprint recognizer 620 through the second transistor T2 and the first sensing line SL1.

In this case, a level of a current or a level of a voltage provided to the fingerprint recognizer 620 through the first transistor T1, the second transistor T2, and the first sensing line SL1 may vary based on the ultrasonic voltage. That is, a degree to which the first transistor T1 is turned on may vary based on a level of the ultrasonic voltage, and a level of the current or a level of the voltage provided to the fingerprint recognizer 620 may vary based on the degree to which the first transistor T1 is turned on.

Therefore, the fingerprint recognizer 620 may analyze a level of a current or a level of a voltage received through the first sensing line SL1 and may recognize fingerprint information (for example, a valley, a ridge, or an inclined surface) corresponding to a result of the analysis.

Through the above-described processes, pieces of fingerprint information respectively corresponding to fingerprint pixels 510 provided along the first sensing gate line SGL1 may be generated.

Subsequently, in a state where the receiving electrode voltage is supplied to the receiving electrodes 540 again or the receiving electrodes 540 are floated, the driving signal provider 611 may supply the driving signal to a second driving electrode TX2 provided in parallel with a second sensing gate line SLG2 during a predetermined period.

In this case, the sensing gate-off signal may be provided to all of the sensing gate lines SGL1 to SGLm including the second sensing gate line SGL2.

Therefore, while the driving signal is being supplied to the second driving electrode TX2, the second transistors T2 may be turned off, and thus, a sensing signal may not be transferred to the sensing lines SL1 to SLn connected to the second transistors T2.

Subsequently, after the driving signal is supplied, the receiving electrodes 540 may be floated or may be supplied with another voltage.

Subsequently, the receiving electrodes 540 may generate ultrasonic voltages having different levels on the basis of an ultrasonic wave which is output from the second driving electrode TX2, reflected by the finger, and received by the receiving electrodes 540.

In this case, the sensing gate-on signal may be provided to only the second sensing gate line SGL2, the sensing gate-off signal may be provided to the other sensing gate lines SGL1 and SGL3 to SGLm, and a voltage having a constant level may be provided to the fixed voltage line VDD.

Therefore, third transistors T3 configuring fingerprint pixels 510 provided along the second sensing gate line SGL2 may all be turned off, and all of second transistors T2 of the fingerprint pixels 510 may be turned on.

Therefore, as described above, a level of a current or a level of a voltage transferred to the fingerprint recognizer 620 through the sensing line SL may vary based on a level of an ultrasonic voltage provided to the gate of the first transistor T1.

The fingerprint recognizer 620 may generate pieces of fingerprint information respectively corresponding to the fingerprint pixels 510 provided along the second sensing gate line SGL2, based on a level of a current or a level of a voltage transferred through each of the sensing lines SL1 to SLn.

In this case, the sensing gate-on signal provided to the second sensing gate line SGL2 may be provided to a gate of a third transistor T3 of each of the fingerprint pixels 510 provided along the first sensing gate line SGL1 on which fingerprint sensing has been performed. Accordingly, the third transistor T3 of each of the fingerprint pixels 510 provided along the first sensing gate line SGL1 may be turned on.

A first terminal of the third transistor T3 may be connected to the receiving electrode 540, and a second terminal of the third transistor T3 may be connected to the fingerprint common voltage line VC. The fingerprint common voltage line VC may be connected to a terminal supplied with a fingerprint common voltage. The fingerprint common voltage may be the ground voltage, or may be a predetermined voltage. The third transistor T3 may discharge, through the fingerprint common voltage line VC, an electric charge remaining in the fingerprint pixel 510 after fingerprint sensing, thereby initializing the fingerprint pixel 510.

That is, when pieces of fingerprint information corresponding to the fingerprint pixels 510 provided along the second sensing gate line SGL2 are generated based on the sensing gate-on signal provided to the second sensing gate line SGL2, each of fingerprint pixels 510 provided along the first sensing gate line SGL1 on which fingerprint sensing has been completed may be initialized by the third transistor T3 and the sensing gate-on signal provided to the second sensing gate line SGL2.

Finally, the above-described processes may be repeated on third to m+1th sensing gate lines SGL3 to SGLm+1, and thus, pieces of fingerprint information corresponding to all fingerprint pixels 510 included in the fingerprint sensor 500 may be generated.

The fingerprint recognizer 620 may combine the pieces of fingerprint information determined through the processes to generate one fingerprint.

A driving method, corresponding to a case where the driving electrode unit 560 is configured with one driving electrode, may include the above-described processes. That is, comparing with a fingerprint sensor 500 including a driving electrode unit 560 including driving electrodes TX1 to TXm, a driving method of a fingerprint sensor 500 including a driving electrode unit 560 including one driving electrode may have a difference in that a driving signal sequentially input thereto is provided to a whole surface of the fingerprint sensor 500.

In the fingerprint sensor 500 where the driving electrode unit 560 includes the driving electrodes TX1 to TXm each having a rod shape, a driving electrode parallel to a sensing gate line supplied with a fingerprint gate-on signal for fingerprint recognition may be individually driven, and thus, the fingerprint recognition performance of a position-based fingerprint sensor may be enhanced. Also, the driving electrodes TX1 to TXm may be sequentially driven, thereby decreasing power consumption.

A structure of the fingerprint sensor 500 where the driving electrode unit 560 includes one driving electrode having a plate shape may be simple, and thus, the manufacturing cost of the fingerprint sensor 500 may be reduced and a process of manufacturing the fingerprint sensor 500 may be simplified. Also, in the fingerprint sensor 500 including one driving electrode having a plate shape, a complicated circuit for sequentially driving the driving electrodes may not be needed.

Figure 7:
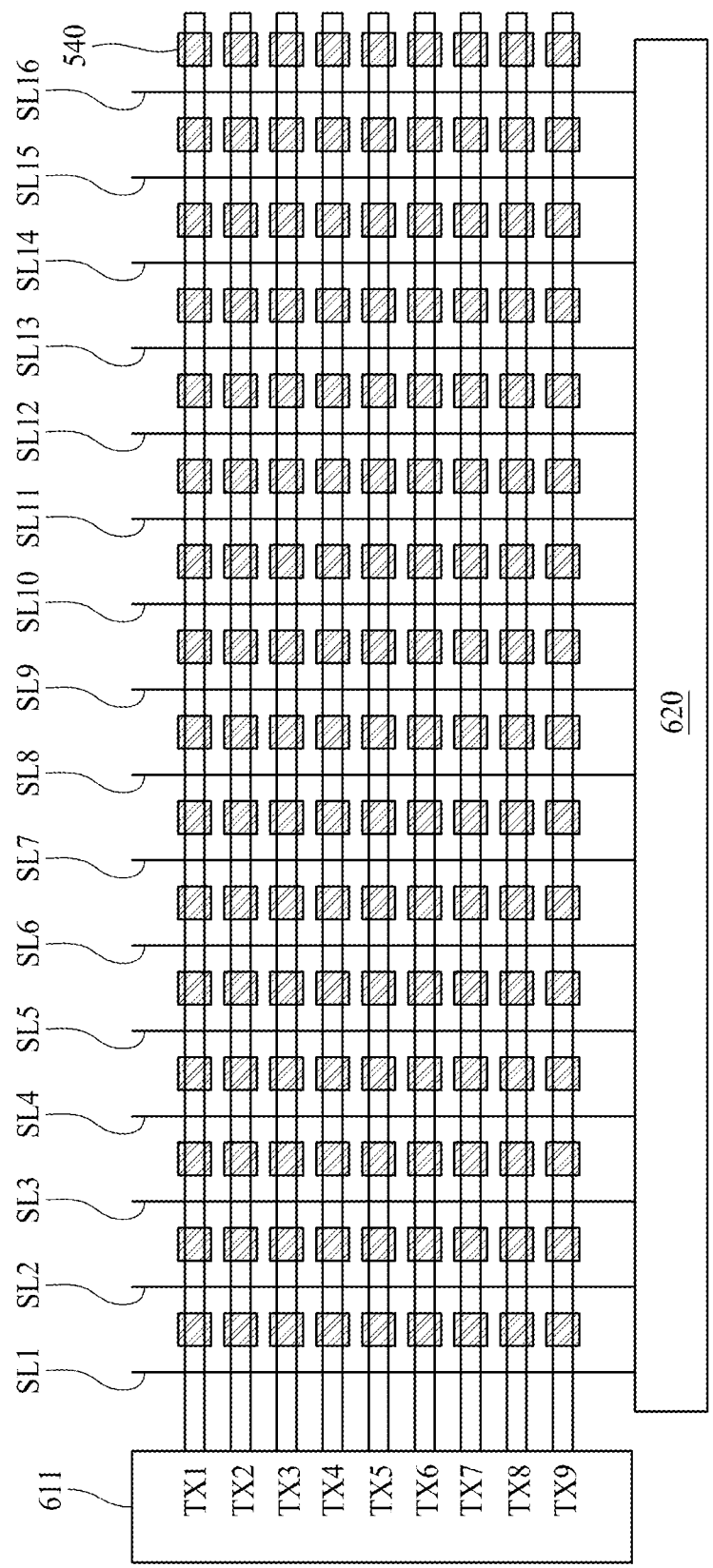
FIG. 7 is an exemplary diagram illustrating a configuration of each of a fingerprint sensor and a fingerprint sensor driver for describing a driving method of a display apparatus including a large-area fingerprint sensor according to the present disclosure.
Figure 8:
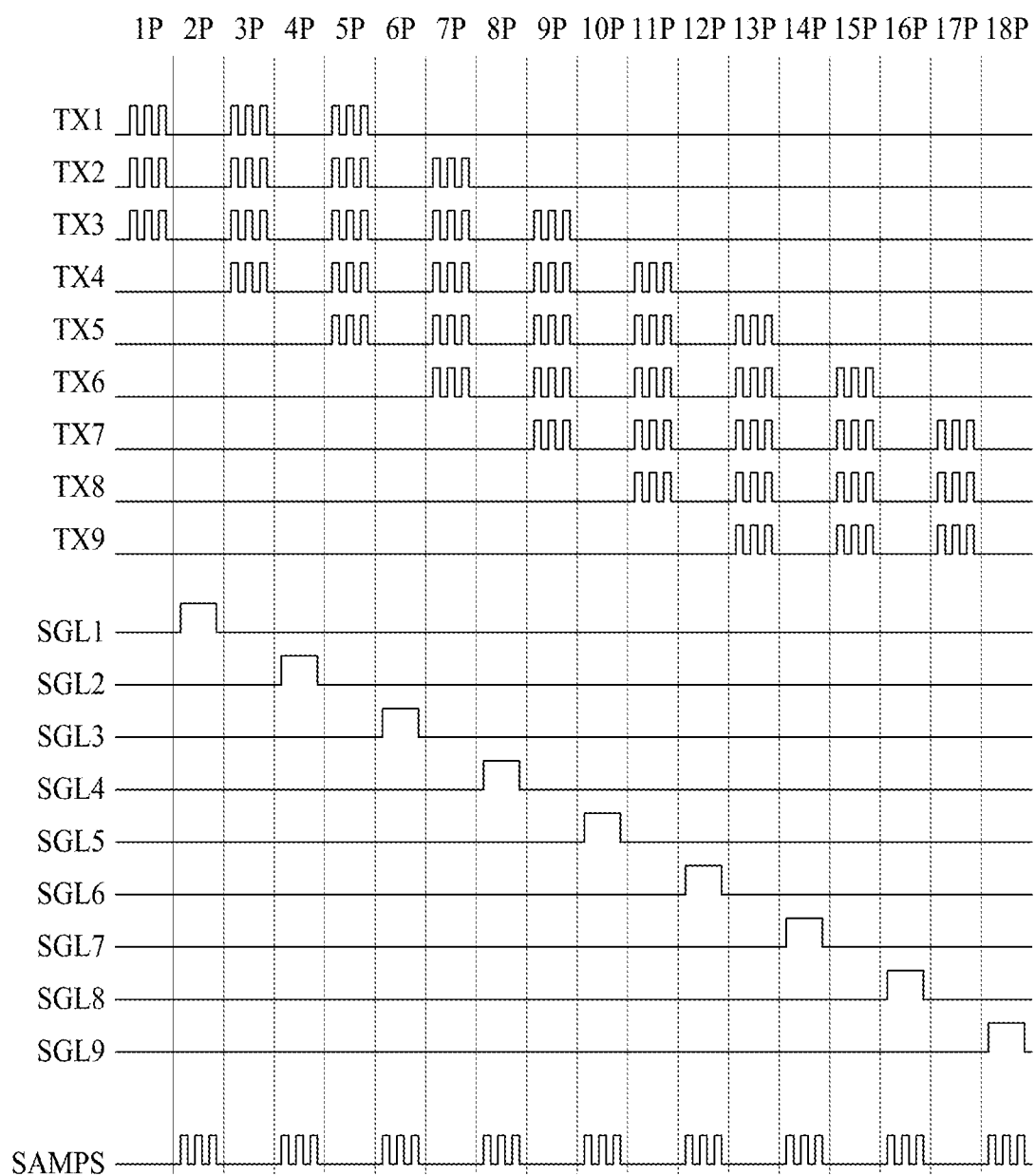
FIG. 8 is an exemplary diagram showing waveforms of signals, generated by a fingerprint sensor driver, for driving the fingerprint sensor illustrated in FIG. 7.

FIG. 7 is an exemplary diagram illustrating a configuration of each of a fingerprint sensor and a fingerprint sensor driver for describing a driving method of a display apparatus including a large-area fingerprint sensor according to the present disclosure, and FIG. 8 is an exemplary diagram showing waveforms of signals, generated by a fingerprint sensor driver, for driving the fingerprint sensor illustrated in FIG. 7.

Hereinafter, for convenience of description, as illustrated in FIG. 7, a fingerprint sensor 500 including nine driving electrodes TX1 to TX9, a plurality of receiving electrodes 540, and sixteen sensing lines SL1 to SL16 will be described as an example of the present disclosure. As described above, each of the receiving electrodes 540 may be included in the fingerprint pixel 510.

In this case, the nine driving electrodes TX1 to TX9 may be connected to the driving signal provider 611 for supplying the driving signals to the driving electrodes TX1 to TXm, and the sixteen sensing lines SL1 to SL16 may be connected to the fingerprint recognizer 620 for recognizing a fingerprint by using sensing signals received from the fingerprint sensor 500.

Hereinafter, for convenience of description, a fingerprint sensor driver 600 which simultaneously supplies driving signals to five adjacent driving electrodes will be described as an example of the present disclosure, but the fingerprint sensor driver 600 may simultaneously supply the driving signals to three adjacent driving electrodes, simultaneously supply the driving signals to seven adjacent driving electrodes, or simultaneously supply the driving signals to a number of adjacent driving electrodes.

That is, as described above with reference to FIG. 5, an ultrasonic wave output from a first point A may not be reflected to only a receiving electrodes with the first point A disposed therein and may be reflected to other receiving electrodes near the first point A.

Therefore, an ultrasonic wave (hereinafter referred to as a reception ultrasonic wave) received by the first point A may include ultrasonic waves which are output from a periphery of the first point A and reflected, in addition to the ultrasonic wave output from the first point A.

There being a number of received ultrasonic waves may denote that there a number of data available for analysis, and this may enhance fingerprint recognition performance. Fingerprint information, which corresponds to the first point A and is generated from a reception ultrasonic wave which is output from the first point A and a periphery thereof and is received by the first point A, may include information which more matches a real fingerprint of a user than fingerprint information which corresponds to the first point A and is generated from only an ultrasonic wave output from the first point A.

Therefore, in the present disclosure, a driving signal may be simultaneously supplied to at least three driving electrodes, and then, pieces of fingerprint information may be generated at a position corresponding to one of the at least three driving electrodes. Hereinafter, a method of simultaneously supplying a driving signal to five driving electrodes will be described as an example of the present disclosure. Hereinafter, description which is the same as or similar to description given above with reference to FIG. 6 is omitted or will be briefly given.

First, during a first period 1P, the driving signal provider 611 may supply a driving signal illustrated in FIG. 8 to first to third driving electrodes TX1 to TX3 of a fingerprint sensor 500 having a structure illustrated in FIGS. 6 and 7. The driving signal may include at least one pulse. Therefore, the driving signal including three pulses is illustrated in FIG. 8, but the number of pulses constituting the driving signal may be variously changed. In this case, a sensing gate-off signal may be supplied to all sensing gate lines SGL1 to SGL9 including the first sensing gate line SGL1.

The driving signal may be supplied, and then, the receiving electrodes 540 may be floated or may be supplied with another voltage.

Ultrasonic waves which are output from the first to third driving electrodes TX1 to TX3 and are reflected by a finger may be transferred in a direction toward the first driving electrode TX1.

Subsequently, during a second period 2P occurring after the first period 1P, the sensing gate signal provider 612 may supply the sensing gate-on signal to only the first sensing gate line SGL1, supply the sensing gate-off signal to the other sensing gate lines SGL2 to SGL9, and supply a voltage having a constant level to the fixed voltage line VDD.

Therefore, third transistors T3 configuring fingerprint pixels 510 provided along the first sensing gate line SGL1 may all be turned off, and all of second transistors T2 of the fingerprint pixels 510 may be turned on.

Therefore, as described above, a level of a current or a level of a voltage transferred to the fingerprint recognizer 620 through the sensing line SL may vary based on a level of a voltage provided to the gate of the first transistor T1.

The fingerprint recognizer 620 may generate pieces of fingerprint information respectively corresponding to the fingerprint pixels 510 provided along the first sensing gate line SGL1, based on a level of a current or a level of a voltage transferred through each of the sensing lines SL1 to SLn.

In this case, during the second period 2P, the fingerprint recognizer 620 may perform three sensing operations by using a sampling control signal SAMPS shown in FIG. 8.

A sensing signal, received through the sensing lines SL1 to SL16 in a first sensing operation performed during the second period 2P, may be a signal generated from a reception ultrasonic wave which is output from the first driving electrode TX1, reflected by a finger of a user, and transferred to receiving electrodes 540 overlapping the first driving electrode TX1. A sensing signal, received through the sensing lines SL1 to SL16 in a second sensing operation performed during the second period 2P, may be a signal generated from a reception ultrasonic wave which is output from the second driving electrode TX2, reflected by the finger of the user, and transferred to the receiving electrodes 540 overlapping the first driving electrode TX1. A sensing signal, received through the sensing lines SL1 to SL16 in a third sensing operation performed during the second period 2P, may be a signal generated from a reception ultrasonic wave which is output from the third driving electrode TX3, reflected by the finger of the user, and transferred to the receiving electrodes 540 overlapping the first driving electrode TX1.

An interval between three pulses of the sampling control signal SAMPS and a width of each of the three pulses may be variously set based on an interval between ultrasonic waves, which are output from the first to third driving electrodes TX1 to TX3 and are received by receiving electrodes corresponding to the first driving electrode TX1, and a width of each of the received ultrasonic waves.

That is, by using the three sensing operations described above, the fingerprint recognizer 620 may generate pieces of fingerprint information respectively corresponding to the fingerprint pixels 510 provided along the first sensing gate line SGL1.

Subsequently, during a third period 3P, the driving signal provider 611 may supply a driving signal to first to fourth driving electrodes TX1 to TX4. In this case, the sensing gate-off signal may be supplied to all sensing gate lines SGL1 to SGL9 including the first sensing gate line SGL1.

Subsequently, during a fourth period 4P occurring after the third period 3P, the sensing gate signal provider 612 may supply the sensing gate-on signal to only the second sensing gate line SGL2, supply the sensing gate-off signal to the other sensing gate lines SGL1 and SGL3 to SGL9, and supply a voltage having a constant level to the fixed voltage line VDD.

Therefore, third transistors T3 configuring fingerprint pixels 510 provided along the second sensing gate line SGL2 may all be turned off, and all of second transistors T2 of the fingerprint pixels 510 may be turned on.

During the fourth period 4P, the fingerprint recognizer 620 may perform three sensing operations by using the sampling control signal SAMPS shown in FIG. 8, and thus, may generate pieces of fingerprint information respectively corresponding to the fingerprint pixels 510 provided along the second sensing gate line SGL2.

A sensing signal, received through the sensing lines SL1 to SL16 in a first sensing operation performed during the fourth period 4P, may be a signal generated from a reception ultrasonic wave which is output from the second driving electrode TX2, reflected by the finger of the user, and transferred to receiving electrodes 540 overlapping the second driving electrode TX2. A sensing signal, received through the sensing lines SL1 to SL16 in a second sensing operation performed during the fourth period 4P, may be a signal generated from a reception ultrasonic wave which is output from each of the first and third driving electrodes TX1 and TX3, reflected by the finger of the user, and transferred to receiving electrodes 540 overlapping the second driving electrode TX2. A sensing signal, received through the sensing lines SL1 to SL16 in a third sensing operation performed during the fourth period 4P, may be a signal generated from a reception ultrasonic wave which is output from the fourth driving electrode TX4, reflected by the finger of the user, and transferred to receiving electrodes 540 overlapping the second driving electrode TX2.

In this case, in FIG. 7, since a driving electrode is not provided at an upper end of the first driving electrode TX1 and the second and third driving electrodes TX2 and TX3 are provided at only a lower end of the first driving electrode TX1, the second sensing operation and the third sensing operation performed during the second period 2P may each use only a sensing signal based on an ultrasonic wave which is output from one driving electrode (the second driving electrode TX2 or the third driving electrode TX3).

However, since the first driving electrode TX1 is provided at an upper end of the second driving electrode TX2 and the third and fourth driving electrodes TX3 and TX4 are provided at a lower end of the second driving electrode TX2, the second sensing operation of the fourth period 4P may use a sensing signal based on an ultrasonic wave which is output from each of the first driving electrode TX1 and the third driving electrode TX3, and the third sensing operation of the fourth period 4P may use only a sensing signal based on an ultrasonic wave which is output from the fourth driving electrode TX4.

That is, since the first driving electrode TX1 and the third driving electrode TX3 are apart from the second driving electrode TX2 by the same interval, ultrasonic waves output from the first driving electrode TX1 and the third driving electrode TX3 may be received by a position corresponding to the second driving electrode TX2 during the same period, and thus, the second sensing operation of the fourth period 4P may use a sensing signal based on ultrasonic waves output from the first driving electrode TX1 and the third driving electrode TX3.

However, since there is no driving electrode which is apart from the fourth driving electrode TX2 by the same interval with respect to the second driving electrode TX2, the third sensing operation of the fourth period 4P may use a sensing signal based on an ultrasonic wave output from the fourth driving electrode TX4.

That is, by using the three sensing operations described above, the fingerprint recognizer 620 may generate pieces of fingerprint information respectively corresponding to the fingerprint pixels 510 provided along the second sensing gate line SGL2 during the fourth period 4P.

Subsequently, during a fifth period 5P, the driving signal provider 611 may supply a driving signal to first to fifth driving electrodes TX1 to TX5. In this case, the sensing gate-off signal may be supplied to all sensing gate lines SGL1 to SGL9 including the first sensing gate line SGL1.

Subsequently, during a sixth period 6P occurring after the fifth period 5P, the sensing gate signal provider 612 may supply the sensing gate-on signal to only the third sensing gate line SGL3, supply the sensing gate-off signal to the other sensing gate lines SGL1, SGL2, and SGL4 to SGL9, and supply a voltage having a constant level to the fixed voltage line VDD.

Therefore, third transistors T3 configuring fingerprint pixels 510 provided along the third sensing gate line SGL3 may all be turned off, and all of second transistors T2 of the fingerprint pixels 510 may be turned on.

During the sixth period 6P, the fingerprint recognizer 620 may perform three sensing operations by using the sampling control signal SAMPS shown in FIG. 8, and thus, may generate pieces of fingerprint information respectively corresponding to the fingerprint pixels 510 provided along the third sensing gate line SGL3.

A sensing signal, received through the sensing lines SL1 to SL16 in a first sensing operation performed during the fourth period 4P, may be a signal generated from a reception ultrasonic wave which is output from the third driving electrode TX3, reflected by the finger of the user, and transferred to receiving electrodes 540 overlapping the third driving electrode TX3. A sensing signal, received through the sensing lines SL1 to SL16 in a second sensing operation performed during the fourth period 4P, may be a signal generated from a reception ultrasonic wave which is output from each of the second and fourth driving electrodes TX2 and TX4, reflected by the finger of the user, and transferred to receiving electrodes 540 overlapping the third driving electrode TX3. A sensing signal, received through the sensing lines SL1 to SL16 in a third sensing operation performed during the fourth period 4P, may be a signal generated from a reception ultrasonic wave which is output from each of the first and fifth driving electrodes TX1 and TX5, reflected by the finger of the user, and transferred to receiving electrodes 540 overlapping the third driving electrode TX3.

Since the first and second driving electrodes TX1 and TX2 are provided at an upper end of the third driving electrode TX3 and the fourth and fifth driving electrodes TX4 and TX5 are provided at a lower end of the third driving electrode TX3, the second sensing operation of the sixth period 6P may use a sensing signal based on a reception ultrasonic wave which is output from each of the second driving electrode TX2 and the fourth driving electrode TX4, and the third sensing operation of the sixth period 6P may use a sensing signal based on a reception ultrasonic wave which is output from each of the first driving electrode TX1 and the fifth driving electrode TX5.

That is, since the second driving electrode TX2 and the fourth driving electrode TX4 are apart from the third driving electrode TX3 by the same interval, ultrasonic waves output from the second driving electrode TX2 and the fourth driving electrode TX4 may be received by a position corresponding to the third driving electrode TX3 during the same period, and thus, the second sensing operation of the sixth period 6P may use a sensing signal based on ultrasonic waves output from the second driving electrode TX2 and the fourth driving electrode TX4.

Moreover, since the first driving electrode TX1 and the fifth driving electrode TX5 are apart from the third driving electrode TX3 by the same interval, ultrasonic waves output from the first driving electrode TX1 and the fifth driving electrode TX5 may be received by a position corresponding to the third driving electrode TX3 during the same period, and thus, the third sensing operation of the sixth period 6P may use a sensing signal based on ultrasonic waves output from the first driving electrode TX1 and the fifth driving electrode TX5.

That is, by using the three sensing operations described above, the fingerprint recognizer 620 may generate pieces of fingerprint information respectively corresponding to the fingerprint pixels 510 provided along the third sensing gate line SGL3 during the sixth period 6P.

Subsequently, operations performed during the fifth period 5P and the sixth period 6P may be performed on the fourth to seventh driving electrodes TX4 to TX7 on the basis of the same principle.

Therefore, pieces of fingerprint information respectively corresponding to fingerprint pixels 510 provided along the fourth sensing gate line SGL4 may be generated during a seventh period 7P and an eighth period 8P, pieces of fingerprint information respectively corresponding to fingerprint pixels 510 provided along the fifth sensing gate line SGL5 may be generated during a ninth period 9P and a tenth period 10P, pieces of fingerprint information respectively corresponding to fingerprint pixels 510 provided along the sixth sensing gate line SGL6 may be generated during an eleventh period 11P and a twelfth period 12P, and pieces of fingerprint information respectively corresponding to fingerprint pixels 510 provided along the seventh sensing gate line SGL7 may be generated during a thirteenth period 13P and a fourteenth period 14P.

Subsequently, operations performed during the third period 3P and the fourth period 4P may be performed based on the same principle in a fifteenth period 15P and a sixteenth period 16P.

That is, during the fifteenth period 15P and the sixteenth period 16P, pieces of fingerprint information respectively corresponding to fingerprint pixels 510 provided along the eighth sensing gate line SGL8 may be generated by four electrodes (i.e., the sixth to ninth driving electrodes TX6 to TX9).

Subsequently, operations performed during the first period 1P and the second period 2P may be performed based on the same principle in a seventeenth period 17P and an eighteenth period 18P.

That is, during the seventeenth period 17P and the eighteenth period 18P, pieces of fingerprint information respectively corresponding to fingerprint pixels 510 provided along the ninth sensing gate line SGL9 may be generated by three electrodes (i.e., the seventh to ninth driving electrodes TX7 to TX9).

Finally, the fingerprint recognizer 620 may combine the pieces of fingerprint information determined through the processes to generate one fingerprint.

The fingerprint recognizer 620 may compare the fingerprint with the reference fingerprint stored in the storage unit 630 to determine whether the fingerprint matches the reference fingerprint.

A result of determining whether the fingerprint matches the reference fingerprint may be applied to an application executed by various kinds of electronic devices (for example, smartphones, table personal computers (PCs), monitors, televisions (TVs), etc.) including the display apparatus including the large-area fingerprint sensor according to the present disclosure.

For example, when an application executed by a smartphone needs user authentication based on a fingerprint, the smartphone may authenticate the user on the basis of a determination result transmitted from the fingerprint recognizer 620.

According to the present disclosure described above, since sensing gate lines included in a fingerprint sensor are individually driven, pieces of fingerprint information corresponding to a position at which a sensing gate line is driven may be accurately generated, and thus, fingerprint recognition performance may be enhanced.

Figure 9:
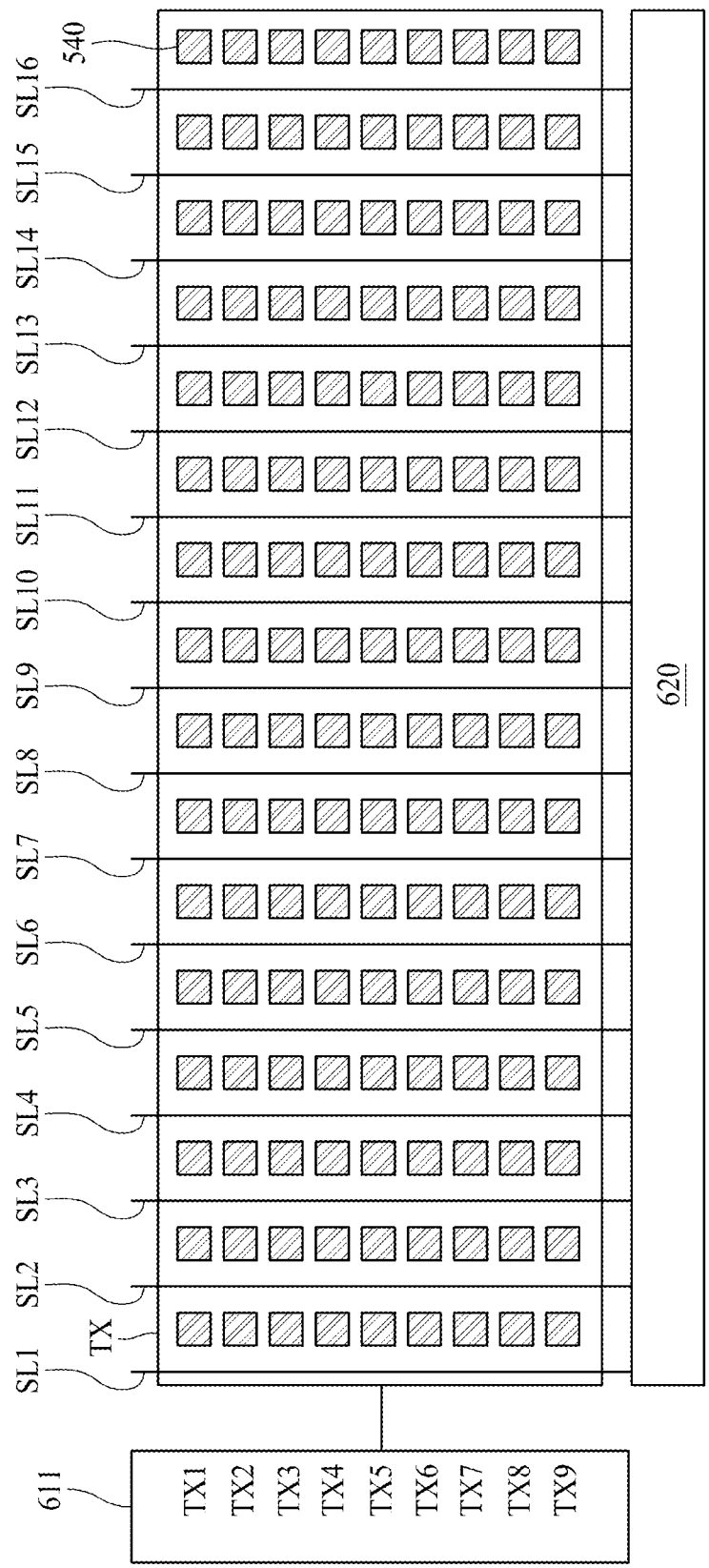
FIG. 9 is another exemplary diagram illustrating a configuration of each of a fingerprint sensor and a fingerprint sensor driver for describing a driving method of a display apparatus including a large-area fingerprint sensor according to the present disclosure.
Figure 10:
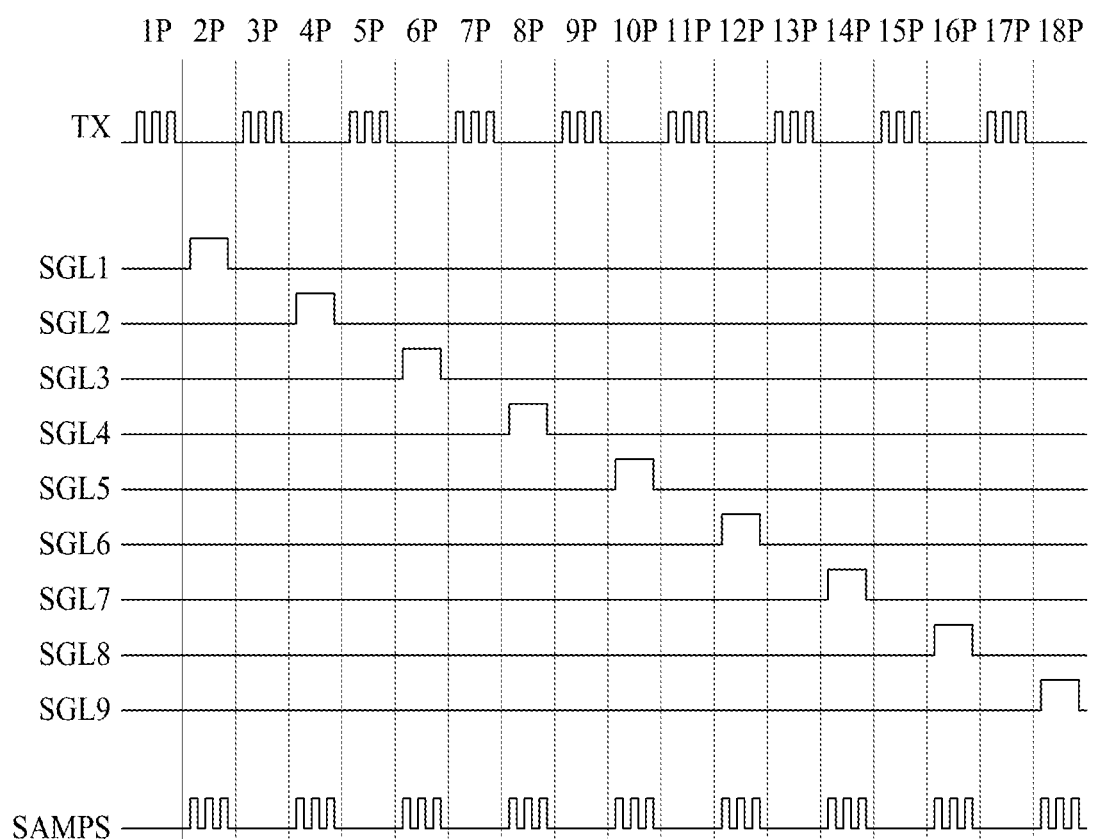
FIG. 10 is an exemplary diagram showing waveforms of signals, generated by a fingerprint sensor driver, for driving the fingerprint sensor illustrated in FIG. 9.

FIG. 9 is another exemplary diagram illustrating a configuration of each of a fingerprint sensor and a fingerprint sensor driver for describing a driving method of a display apparatus including a large-area fingerprint sensor according to the present disclosure, and FIG. 10 is an exemplary diagram showing waveforms of signals, generated by a fingerprint sensor driver, for driving the fingerprint sensor illustrated in FIG. 9.

The driving electrode unit 560 applied to the present disclosure, as described above, may include a plurality of driving electrodes each having a rod shape, but may include one driving electrode having a plate shape.

The method described above with reference to FIGS. 7 and 8 may be a driving method of a display apparatus including a driving electrode unit 560 including a plurality of driving electrodes each having a rod shape.

Hereinafter, a driving method of a display apparatus including a driving electrode unit 560 including one driving electrode having a plate shape will be described with reference to FIGS. 9 and 10.

The driving method of the display apparatus including the driving electrode unit 560 including one driving electrode may be similar to the method described above with reference to FIGS. 7 and 8.

Therefore, when a resolution where a fingerprint sensor illustrated in FIG. 9 recognizes a fingerprint is the same as or similar to a resolution where a fingerprint sensor illustrated in FIG. 7 recognizes a fingerprint, the display apparatus illustrated in FIG. 9 may be driven by using signals similar to signals shown in FIG. 8.

However, since the fingerprint sensor 500 illustrated in FIG. 9 includes only one driving electrode TX, a driving signal supplied from the driving signal provider 611 to the driving electrode TX may be configured as shown in FIG. 10.

That is, as shown in FIG. 10, the driving signal provider 611 may supply the driving signal to the driving electrode TX during only odd-numbered periods among the first to eighteenth periods 1P to 18P.

In this case, by using the same method as the method described above with reference to FIGS. 7 and 8, the fingerprint recognizer 620 may generate pieces of fingerprint information in each of the fingerprint pixels 510 and may finally generate a fingerprint by using the pieces of fingerprint information. A driving method of a display apparatus using signals and the fingerprint sensor 500 illustrated in FIG. 9 will be described below. Hereinafter, description which is the same as or similar to description given above with reference to FIGS. 7 and 8 is omitted or will be briefly given.

First, during a first period 1P, the driving signal provider 611 may supply a driving signal illustrated in FIG. 10 to the driving electrode TX of the fingerprint sensor 500 having a structure illustrated in FIG. 9. In this case, the sensing gate-off signal may be supplied to all sensing gate lines SGL1 to SGLm including the first sensing gate line SGL1.

The driving signal may be supplied, and then, the receiving electrodes 540 may be floated or may be supplied with another voltage.

Subsequently, during a second period 2P occurring after the first period 1P, the sensing gate signal provider 612 may supply the sensing gate-on signal to only the first sensing gate line SGL1, supply the sensing gate-off signal to the other sensing gate lines SGL2 to SGL9, and supply a voltage having a constant level to the fixed voltage line VDD.

In this case, during the second period 2P, the fingerprint recognizer 620 may perform three sensing operations by using a sampling control signal SAMPS shown in FIG. 10.

A sensing signal, received through each of the sensing lines SL1 to SL16 in a first sensing operation of the second period 2P, may be a signal generated from a reception ultrasonic wave which is output from a region, corresponding to fingerprint pixels 510 connected to the first sensing gate line SGL1, of the driving electrode TX, reflected by a finger of a user, and transferred to receiving electrodes 540 disposed at positions corresponding to the fingerprint pixels 510 connected to the first sensing gate line SGL1. A sensing signal, received through each of the sensing lines SL1 to SL16 in a second sensing operation of the second period 2P, may be a signal generated from a reception ultrasonic wave which is output from a region, corresponding to fingerprint pixels 510 connected to the second sensing gate line SGL2, of the driving electrode TX, reflected by the finger of the user, and transferred to receiving electrodes 540 disposed at positions corresponding to the fingerprint pixels 510 connected to the first sensing gate line SGL1. A sensing signal, received through each of the sensing lines SL1 to SL16 in a third sensing operation of the second period 2P, may be a signal generated from a reception ultrasonic wave which is output from a region, corresponding to fingerprint pixels 510 connected to the third sensing gate line SGL3, of the driving electrode TX, reflected by the finger of the user, and transferred to receiving electrodes 540 disposed at positions corresponding to the fingerprint pixels 510 connected to the first sensing gate line SGL1.

That is, by using the three sensing operations described above, the fingerprint recognizer 620 may generate pieces of fingerprint information respectively corresponding to the fingerprint pixels 510 provided along the first sensing gate line SGL1.

Subsequently, during a third period 3P, the driving signal provider 611 may supply a driving signal to the driving electrode TX. In this case, the sensing gate-off signal may be supplied to all sensing gate lines SGL1 to SGL9.

Subsequently, during a fourth period 4P occurring after the third period 3P, the sensing gate signal provider 612 may supply the sensing gate-on signal to only the second sensing gate line SGL2, supply the sensing gate-off signal to the other sensing gate lines SGL1 and SLG3 to SGL9, and supply a voltage having a constant level to the fixed voltage line VDD.

During the fourth period 4P, the fingerprint recognizer 620 may perform three sensing operations by using the sampling control signal SAMPS shown in FIG. 10, and thus, may generate pieces of fingerprint information respectively corresponding to the fingerprint pixels 510 provided along the second sensing gate line SGL2.

A sensing signal, received through each of the sensing lines SL1 to SL16 in a first sensing operation of the fourth period 4P, may be a signal generated from a reception ultrasonic wave which is output from a region, corresponding to fingerprint pixels 510 connected to the second sensing gate line SGL2, of the driving electrode TX, reflected by the finger of the user, and transferred to receiving electrodes 540 disposed at positions corresponding to the fingerprint pixels 510 connected to the second sensing gate line SGL2. A sensing signal, received through each of the sensing lines SL1 to SL16 in a second sensing operation of the fourth period 4P, may be a signal generated from a reception ultrasonic wave which is output from a region, corresponding to fingerprint pixels 510 connected to the first and third sensing gate line SGL1 and SGL3, of the driving electrode TX, reflected by the finger of the user, and transferred to receiving electrodes 540 disposed at positions corresponding to the fingerprint pixels 510 connected to the second sensing gate line SGL2. A sensing signal, received through each of the sensing lines SL1 to SL16 in a third sensing operation of the fourth period 4P, may be a signal generated from a reception ultrasonic wave which is output from a region, corresponding to fingerprint pixels 510 connected to the fourth sensing gate line SGL4, of the driving electrode TX, reflected by the finger of the user, and transferred to receiving electrodes 540 disposed at positions corresponding to the fingerprint pixels 510 connected to the second sensing gate line SGL2.

That is, by using the three sensing operations described above, the fingerprint recognizer 620 may generate pieces of fingerprint information respectively corresponding to the fingerprint pixels 510 provided along the second sensing gate line SGL2 during the fourth period 4P.

Subsequently, during a fifth period 5P, the driving signal provider 611 may supply a driving signal to the driving electrode TX. In this case, the sensing gate-off signal may be supplied to all sensing gate lines SGL1 to SGL9.

Subsequently, during a sixth period 6P occurring after the fifth period 5P, the sensing gate signal provider 612 may supply the sensing gate-on signal to only the third sensing gate line SGL3, supply the sensing gate-off signal to the other sensing gate lines SGL1, SGL2 and SGL4 to SGL9, and supply a voltage having a constant level to the fixed voltage line VDD.

During the sixth period 6P, the fingerprint recognizer 620 may perform three sensing operations by using the sampling control signal SAMPS shown in FIG. 10, and thus, may generate pieces of fingerprint information respectively corresponding to the fingerprint pixels 510 provided along the third sensing gate line SGL3.

A sensing signal, received through each of the sensing lines SL1 to SL16 in a first sensing operation of the sixth period 6P, may be a signal generated from a reception ultrasonic wave which is output from a region, corresponding to fingerprint pixels 510 connected to the third sensing gate line SGL3, of the driving electrode TX, reflected by the finger of the user, and transferred to receiving electrodes 540 disposed at positions corresponding to the fingerprint pixels 510 connected to the third sensing gate line SGL3. A sensing signal, received through each of the sensing lines SL1 to SL16 in a second sensing operation of the sixth period 6P, may be a signal generated from a reception ultrasonic wave which is output from a region, corresponding to fingerprint pixels 510 connected to the second and fourth sensing gate line SGL2 and SGL4, of the driving electrode TX, reflected by the finger of the user, and transferred to receiving electrodes 540 disposed at positions corresponding to the fingerprint pixels 510 connected to the third sensing gate line SGL3. A sensing signal, received through each of the sensing lines SL1 to SL16 in a third sensing operation of the sixth period 6P, may be a signal generated from a reception ultrasonic wave which is output from a region, corresponding to fingerprint pixels 510 connected to the first and fifth sensing gate lines SGL1 and SGL5, of the driving electrode TX, reflected by the finger of the user, and transferred to receiving electrodes 540 disposed at positions corresponding to the fingerprint pixels 510 connected to the third sensing gate line SGL3.

That is, by using the three sensing operations described above, the fingerprint recognizer 620 may generate pieces of fingerprint information respectively corresponding to the fingerprint pixels 510 provided along the third sensing gate line SGL3 during the sixth period 6P.

Subsequently, operations performed during the fifth period 5P and the sixth period 6P may be performed on fingerprint pixels connected to the fourth to seventh sensing gate lines SGL4 to SGL7 on the basis of the same principle.

Therefore, the pieces of fingerprint information respectively corresponding to the fingerprint pixels 510 provided along the fourth sensing gate line SGL4 may be generated during the seventh period 7P and the eighth period 8P, the pieces of fingerprint information respectively corresponding to the fingerprint pixels 510 provided along the fifth sensing gate line SGL5 may be generated during the ninth period 9P and the tenth period 10P, the pieces of fingerprint information respectively corresponding to the fingerprint pixels 510 provided along the sixth sensing gate line SGL6 may be generated during the eleventh period 11P and the twelfth period 12P, and the pieces of fingerprint information respectively corresponding to the fingerprint pixels 510 provided along the seventh sensing gate line SGL7 may be generated during the thirteenth period 13P and the fourteenth period 14P.

Subsequently, the operations performed during the third period 3P and the fourth period 4P may be performed based on the same principle in the fifteenth period 15P and the sixteenth period 16P.

That is, the pieces of fingerprint information respectively corresponding to the fingerprint pixels 510 provided along the eighth sensing gate line SGL8 may be generated in the fifteenth period 15P and the sixteenth period 16P.

Subsequently, operations performed during the first period 1P and the second period 2P may be performed based on the same principle in the seventeenth period 17P and the eighteenth period 18P.

That is, the pieces of fingerprint information respectively corresponding to the fingerprint pixels 510 provided along the ninth sensing gate line SGL9 may be generated in the seventeenth period 17P and the eighteenth period 18P.

Finally, the fingerprint recognizer 620 may combine the pieces of fingerprint information determined through the processes to generate one fingerprint.

The fingerprint sensor 500 may be provided to correspond to only a portion of a total area of the display panel 100, but the utility of fingerprints increases, the fingerprint sensor 500 may be provided as the same type as that of the display panel 100.

Particularly, a position at which a fingerprint of a user is input may not need to be greater than the display area 120, and thus, for example, the fingerprint sensor 500 may be provided to have a size and a shape for covering at least the display area 120.

In this case, as described above, when the sensing gate lines are sequentially driven and the driving signal and the sensing gate signal are continuously supplied to the fingerprint sensor 500, power consumption of the driver 610 may continuously increase.

Moreover, in a case where the fingerprint recognizer 620 converts all sensing signals received through all sensing lines into digital values to recognize a fingerprint, power consumption of the fingerprint recognizer 620 may continuously increase.

That is, in a case where an electronic device such as a smartphone or a tablet PC is used generally, a period for which the electronic device recognizes a fingerprint may be too less than a total driving period of the electronic device. Also, an area, which is touched by a finger of a user to actually recognize a fingerprint, of the electronic device may be too less than a total area of the display area 120.

Therefore, in the present disclosure, a sensing signal may be generated by supplying a driving signal to only sensing gate lines included in a first touch block corresponding to a position touched by a finger of a user for fingerprint recognition, and the fingerprint of the user may be sensed by using only sensing signals received through sensing lines included in a second touch block corresponding to the position touched by the finger of the user.

Therefore, according to the present disclosure, power consumption of the display apparatus as well as the fingerprint sensor driver 600 may be reduced, and moreover, power consumption of an electronic device with the display apparatus applied thereto may decrease.

Figure 11:
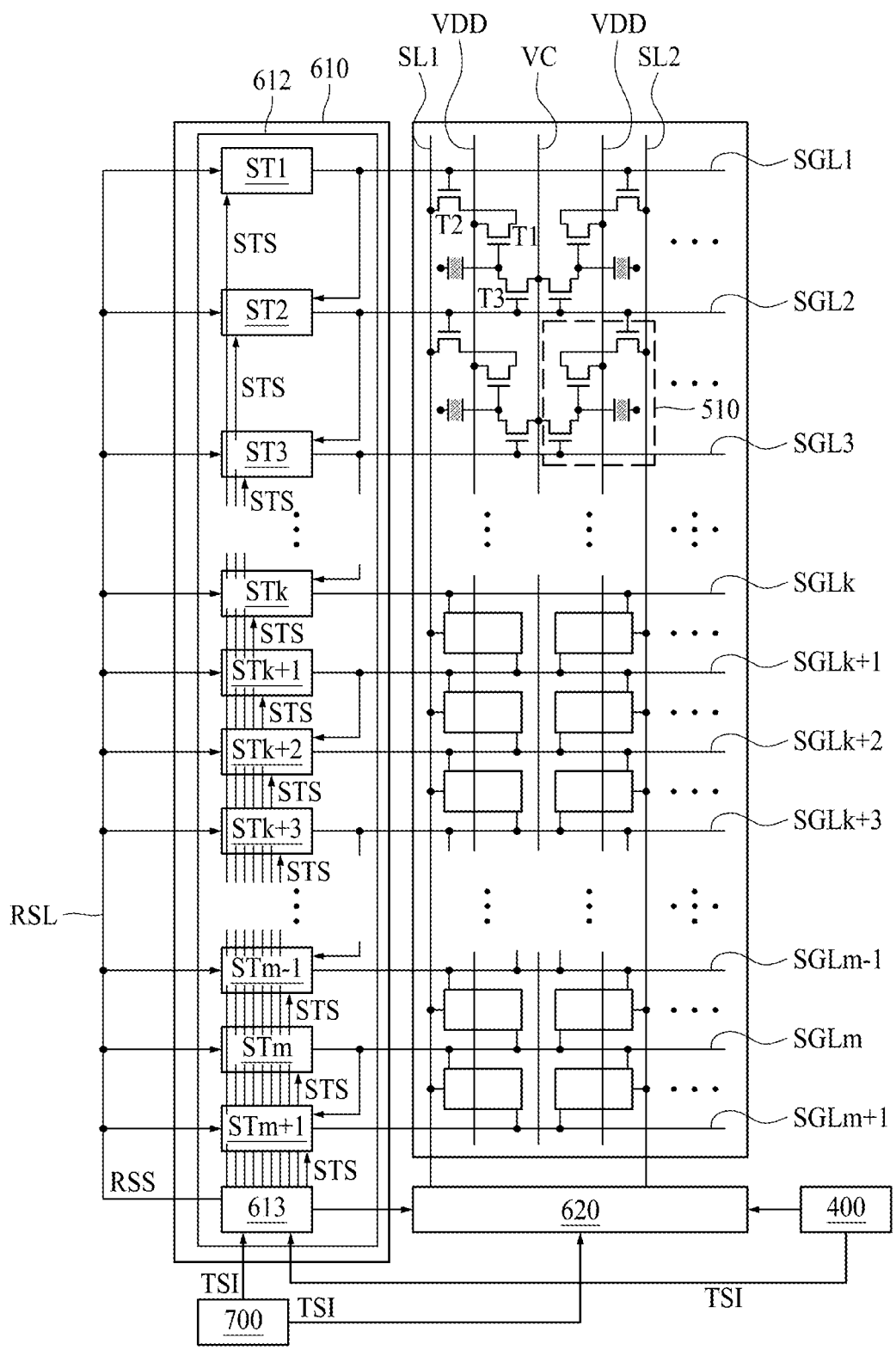
FIG. 11 is an exemplary diagram illustrating a configuration of each of a touch sensor and a sensing gate signal provider applied to a display apparatus including a large-area fingerprint sensor according to the present disclosure.

A configuration of the sensing gate signal provider 612 for performing the above-described function is illustrated in FIG. 11.

FIG. 11 is an exemplary diagram illustrating a configuration of each of a touch sensor and a sensing gate signal provider applied to a display apparatus including a large-area fingerprint sensor according to the present disclosure. In FIG. 11, for convenience of description, a driving electrode unit and a plurality of receiving electrodes are not illustrated. That is, a touch sensor illustrated in FIG. 11 may be configured as the same type as that of the touch sensor illustrated in FIG. 6.

Hereinafter, therefore, descriptions which are the same as or similar to descriptions given above with reference to FIGS. 6 to 10 are omitted or will be briefly given.

As described above, the driver 610 may include a driving signal provider 611 for supplying the driving signals to the driving electrodes and a sensing gate signal provider 612 for supplying the sensing gate signals to the sensing gate lines SGL1 to SGLm.

The driving signal provider 611, as described above with reference to FIG. 6, may sequentially provide a driving signal to one driving electrode, and as described above with reference to FIGS. 6 to 10, may sequentially perform an operation, which simultaneously provides the driving signal to at least three driving electrodes, on all driving electrodes. Also, in a case where the driving electrode unit is configured with one driving electrode, the driving signal provider 611 may repeatedly provide the driving signal to the driving electrode at every predetermined period.

The sensing gate signal provider 612 may be driven based on touch position information TSI transmitted from the touch driver 700 and may provide the driving signal to only sensing gate lines included in a first touch block corresponding to the touch position information TSI.

To this end, as illustrated in FIG. 11, the sensing gate signal provider 612 may include a plurality of stages (for example, first to m+1th stages) ST1 to STm+1 for providing sensing gate signals to the sensing gate lines (for example, first to m+1th sensing gate lines) SGL1 to SGLm+1 and a stage controller 613 for providing a start signal STS to one of the stages ST1 to STm+1 on the basis of the touch position information TSI transmitted from the touch driver 700.

Each of the stages ST1 to STm+1 may be driven by the start signal STS transmitted from the stage controller 613, and a stage next to a stage driven by the start signal STS may be driven by a sensing gate-on signal output from the stage driven by the start signal STS.

For example, when the stage controller 613 provides the start signal STS to the first stage ST1, the first stage ST1 may be driven, and thus, a first sensing gate-on signal may be output from the first stage ST1.

The first sensing gate-on signal may be provided to the first sensing gate line SGL1 connected to the first stage ST1 and may turn on the second transistors T2 connected to the first sensing gate line SGL1.

The first sensing gate-on signal may be provided as a start signal to the second stage ST2 next to the first stage ST1.

That is, the first sensing gate-on signal may be the start signal of the second stage ST2.

Therefore, the second stage ST2 may be driven by the first sensing gate-on signal, and thus, a second sensing gate-on signal may be output from the second stage ST2 to the second sensing gate line SGL2.

The second sensing gate-on signal may turn on the second transistors T2 connected to the second sensing gate line SGL2.

The second sensing gate-on signal may be provided as a start signal to the third stage ST3 provided next to the second stage ST2.

That is, the above-described processes may be repeatedly performed up to the m+1th stage STm+1 which is a last stage, and thus, a sensing gate-on signal may be sequentially provided to the sensing gate lines SGL1 to SGLm+1.

In this case, when the start signal STS output from the stage controller 613 is provided to the third stage ST3, the third to m+1th stages ST3 to STm+1 may sequentially output sensing gate-on signals.

Moreover, when the start signal STS output from the stage controller 613 is provided to the fth stage STf, the fth to m+1th stages STf to STm+1 may sequentially output sensing gate-on signals.

In order to perform the above-described operation, a start signal supply line provided with the start signal STS may be connected to the stage controller 613 and each of the stages. However, the start signal supply line may be connected to only some of the plurality of stages. For example, the start signal supply line may be connected to only odd-numbered stages, or the start signal supply line may be connected to each of even-numbered stages, or the start signal supply line may be connected to at least two stages each.

In order to forcibly block the sensing gate-on signals sequentially output from the stages, the stage controller 613 may provide a reset signal RSS to the stages.

For example, in a case where only the third to m−1th stages ST3 to STm−1 should output the sensing gate-on signal, the stage controller 613 may transfer the start signal STS to the third stage ST3.

Therefore, the third to m−1th stages ST3 to STm−1 may sequentially output the sensing gate-on signal.

In this case, when the m−1th stage STm−1 outputs an m−1th sensing gate-on signal, the stage controller 613 may provide the reset signal RSS to a reset line RSL connected to the stages. That is, the reset signal RSS may be provided to all stages in common.

Therefore, when the m−1th sensing gate-on signal is output, the mth stage STm may no longer output the sensing gate-on signal on the basis of the reset signal RSS provided to the stages.

That is, the reset signal RSS may block the sensing gate-on signal provided from a previous stage to a next stage. To this end, each of the stages may include a switch provided in a line which is provided with the sensing gate-on signal from a previous stage, and for example, the switch may be turned off by the reset signal RSS. When the switch is turned off by the reset signal, the sensing gate-on signal output from a previous stage may not be input to a next stage.

In this case, since the sensing gate-on signal (i.e., a start signal) output from a previous stage is not provided to a next stage, the next stage may not be driven, and thus, the sensing gate-on signal may not be output from the next stage.

Based on the above-described processes, the sensing gate-on signal may be output from only specific stages.

A configuration of each of the stages may be similar to a configuration of each of gate stages included in the gate driver 200, for sequentially outputting current sensing gate-on signals to gate lines.

That is, a basic configuration for sequentially outputting the sensing gate-on signals by using the stages may be the same as a basic configuration for sequentially outputting the sensing gate-on signals by using the gate stages included in the gate driver 200.

In this case, in the gate stages included in the gate driver 200, for example, only a first gate stage may be driven by a start signal provided from the outside (for example, the controller 400) of the gate driver 200, and each of the other gate stages may be driven by a sensing gate-on signal output from a previous gate stage.

However, each of the stages included in the sensing gate signal provider 612 may be configured to be driven by the start signal STS provided from the stage controller 613, in addition to the sensing gate-on signal provided from a previous stage.

Moreover, as described above, each of the stages included in the sensing gate signal provider 612 may include a switch for blocking the sensing gate-on signal provided from a previous stage on the basis of the reset signal RSS provided from the stage controller 613. The switch may be configured with, for example, a switching transistor. That is, when the reset signal is provided to a gate of a switching transistor included in a next stage, the switching transistor may be turned off, and thus, the sensing gate-on signal provided from a previous stage may not be provided to the next stage. Accordingly, the next stage may not output the sensing gate-on signal.

In this case, the touch position information TSI may be provided to the fingerprint recognizer 620 as well as the stage controller 613. Touch position information TSI provided to the stage controller 613 may be the same as or different from touch position information TSI provided to the fingerprint recognizer 620.

For example, the touch position information TSI may include X coordinates and Y coordinates of a touched portion of the touch panel. In this case, the stage controller 613 may calculate a stage number of a stage which is to be provided with the start signal and a stage number of a stage which is to be provided with the reset signal, based on the Y coordinates of the touch position information TSI. Also, the fingerprint recognizer 620 may calculate a sensing unit number of each of sensing units for converting sensing signals, received through the sensing lines, into digital signals to generate pieces of fingerprint information, based on the X coordinates of the touch position information TSI.

Moreover, the touch position information TSI provided to the stage controller 613 may include only Y coordinates of a touched portion of the touch panel, or the touch position information TSI provided to the fingerprint recognizer 620 may include only X coordinates of a touched portion of the touch panel. In this case, the stage controller 613 may calculate a stage number of a stage which is to be provided with the start signal and a stage number of a stage which is to be provided with the reset signal, based on the Y coordinates of the touch position information TSI. Also, the fingerprint recognizer 620 may calculate a sensing unit number of each of sensing units for converting sensing signals, received through the sensing lines, into digital signals to generating sense information, based on the X coordinates of the touch position information TSI.

Detailed functions of the stage controller 613 and the fingerprint recognizer 620 will be described below in detail with reference to FIG. 12.

Figure 12:
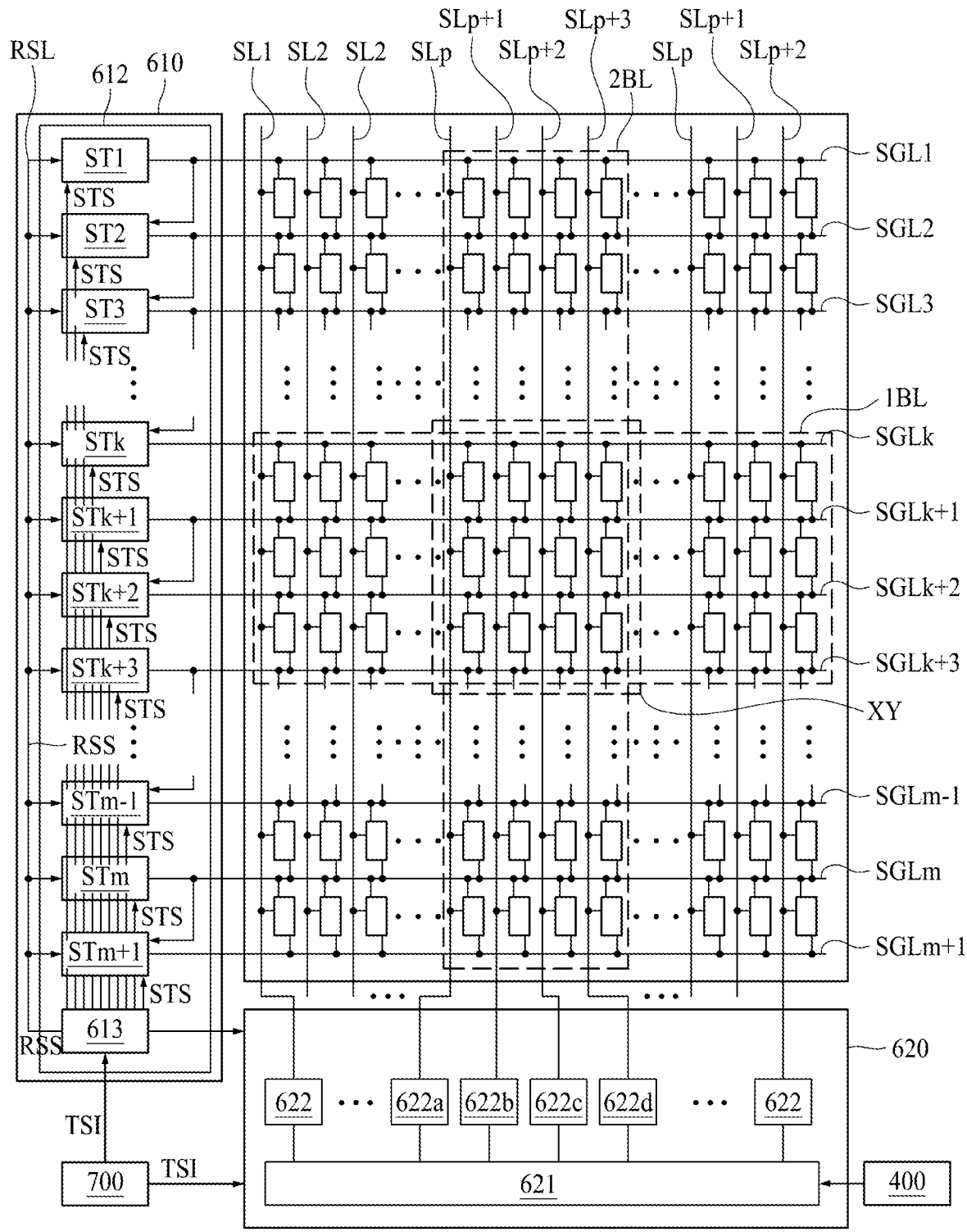
FIG. 12 is an exemplary diagram for describing a method of sensing a fingerprint corresponding to only a touched region in a display apparatus including a large-area fingerprint sensor according to the present disclosure.

FIG. 12 is an exemplary diagram for describing a method of sensing a fingerprint corresponding to only a touched region in a display apparatus including a large-area fingerprint sensor according to the present disclosure. Hereinafter, descriptions which are the same as or similar to descriptions given above with reference to FIGS. 1 to 11 are omitted or will be briefly given.

First, when a fingerprint authentication process is executed by an application of an electronic device (for example, a smartphone, a tablet PC, or the like) including the display apparatus including the large-area fingerprint sensor according to the present disclosure, an external system for controlling the electronic device may transmit, to the controller 400, a control signal for notifying that the fingerprint authentication process is executed.

In this case, the controller 400 may transmit, to the fingerprint sensor driver 600, a fingerprint sensor control signal FCS for notifying that the fingerprint authentication process is executed. The driver 610 and the fingerprint recognizer 620, which have received the fingerprint sensor control signal FCS, may perform a preparation process for fingerprint recognition.

Subsequently, when a finger of a user touches the touch panel 800, the touch driver 700 may generate information (i.e., touch position information TSI) about a touch position (a region referred to by XY in FIG. 12) touched by the finger.

The touch position information TSI may be transmitted to the stage controller 613 and the fingerprint recognizer 620. In this case, as described above, touch position information TSI provided to the stage controller 613 may be the same as or different from touch position information TSI provided to the fingerprint recognizer 620.

The sensing gate signal provider 612, as described above with reference to FIG. 11, may include the plurality of stages (for example, first to m+1th stages) ST1 to STm+1 and the stage controller 613.

The fingerprint recognizer 620 may include a plurality of sensing units 622 for converting sensing signals, received through the sensing lines SL1 to SLn, into digital signals to generate pieces of fingerprint information and a sensing controller 621 for controlling operations of the sensing units 622.

Each of the sensing units 622 may be connected to one sensing line SL and may generate fingerprint information by using a sensing signal received through the sensing line SL.

The sensing controller 621 may select sensing units 622, which are to be actually driven for generating fingerprint information, from among the plurality of sensing units 622 on the basis of X coordinates of the touch position information TSI received from the touch driver 700.

That is, only sensing units selected by the sensing controller 621 may be actually driven to generate pieces of fingerprint information, and sensing units unselected by the sensing unit 622 may not be driven. A selection of a sensing unit to be driven for generating the fingerprint information, for example, may be performed base on an operation of blocking powers provided to the sensing units.

Subsequently, when the touch position information TSI is received, the stage controller 613 may select a stage which is to be provided with a start signal and a stage which is to be provided with the reset signal RSS, based on Y coordinates included in the touch position information TSI.

For example, when the Y coordinates included in the touch position information TSI corresponds to a region referred to by XY in FIG. 12, the stage controller 613 may select a kth stage STk as a stage which is to be provided with the start signal and may select a k+3th stage STk+3 as a stage which is to be provided with the reset signal RSS.

In this case, a region including kth to k+2th sensing gate lines SGLk to SGLk+2 connected to the kth to k+2th stages STk to STk+2 may be referred to as a first touch block.

Subsequently, when the touch position information TSI is received, the sensing controller 621 may select sensing units 622, which are to be actually driven for generating fingerprint information, from among the plurality of sensing units 622 on the basis of the X coordinates of the touch position information TSI received from the touch driver 700.

For example, when the X coordinates included in the touch position information TSI corresponds to the region referred to by XY in FIG. 12, the sensing controller 621 may select pth to p+3th sensing units 622a to 622d as sensing units, which are to be actually driven, from among the plurality of sensing units 622.

In this case, a region including pth to p+3th sensing lines SLp to SLp+3 connected to the pth to p+3th sensing units 622a to 622d may be referred to as a second touch block.

Subsequently, when the processes are completed, the driving signal provider 611 may provide a driving signal to the driving electrode unit 560 as described above with reference to FIGS. 6 to 10.

That is, when the driving electrode unit 560 is configured with the driving electrodes, the driving signal provider 611 may repeat a process of simultaneously providing driving signals to at least three driving electrodes, and when the driving electrode unit 560 is configured with one driving electrode, the driving signal provider 611 may repeatedly provide a driving signal to the driving electrode.

Subsequently, while the driving signal is being provided to the driving electrode unit, when an order in which the sensing gate-on signal is to be provided to the kth sensing gate line SGLk included in a first touch block 1BL arrives, the stage controller 613 may provide the start signal to the kth stage STk.

Therefore, the kth stage STk may provide the sensing gate-on signal to the kth sensing gate line SGLk.

Subsequently, sensing signals may be provided to the fingerprint recognizer 620 through the sensing lines SL1 to SLn on the basis of the sensing gate-on signal provided to the kth sensing gate line SGLk.

In this case, the sensing controller 621 may drive the pth to p+3th sensing units 622a to 622d connected to the pth to p+3th sensing lines SLp to SLp+3 included in a second touch block 2BL to generate pieces of fingerprint information about fingerprint pixels 510 corresponding to the kth sensing gate line SGLk.

Subsequently, the k+1th stage STk+1 may be driven, and thus, the sensing gate-on signal may be provided to the k+1th sensing gate line SGLk+1. In this case, the pth to p+3th sensing units 622a to 622d may be driven, and thus, pieces of fingerprint information about fingerprint pixels 510 corresponding to the k+1th sensing gate line SGLk+1 may be generated.

Subsequently, the k+2th stage STk+2 may be driven, and thus, the sensing gate-on signal may be provided to the k+2th sensing gate line SGLk+2. In this case, the pth to p+3th sensing units 622a to 622d may be driven, and thus, pieces of fingerprint information about fingerprint pixels 510 corresponding to the k+2th sensing gate line SGLk+2 may be generated.

Subsequently, the sensing gate-on signal may be provided to the k+2th sensing gate line SGLk+2, and then, the sensing controller 621 may provide the reset signal RSS to the reset line RSL.

The sensing gate-on signal provided to the k+2th sensing gate line SGLk+2 may not be provided to the k+3th stage STk+3 on the basis of the reset signal RSS. Accordingly, sensing signals may be no longer provided to the fingerprint recognizer 620 through the sensing lines.

In this case, the sensing controller 621 may not drive the sensing units 622. A control signal for allowing the sensing units 622 not to be driven may be transferred by the stage controller 613, or the sensing controller 621 may directly determine a timing at which the sensing units 622 are not driven, based on information about the Y coordinates.

Finally, the fingerprint recognizer 620 may combine the pieces of fingerprint information determined through the processes to generate one fingerprint.

The process of generating the fingerprint may be directly performed by the pth to p+3th sensing units 622a to 622d, and in this case, the sensing controller 621 may drive the pth to p+3th sensing units 622a to 622d until the fingerprint is generated.

However, the process of generating the fingerprint may be performed by a fingerprint generator which has received the pieces of fingerprint information from the pth to p+3th sensing units 622a to 622d. The fingerprint generator may be included in the fingerprint recognizer 620.

That is, driving of the pth to p+3th sensing units 622a to 622d may stop, and then, the process of generating the fingerprint may be performed by the fingerprint recognizer 620.

The fingerprint recognizer 620 may compare the fingerprint with the reference fingerprint stored in the storage unit 630 to determine whether the fingerprint matches the reference fingerprint.

A result of determining whether the fingerprint matches the reference fingerprint may be applied to an application executed by an electronic device including the display apparatus including the large-area fingerprint sensor according to the present disclosure.

For example, when an application executed by a smartphone needs user authentication based on a fingerprint, the smartphone may authenticate the user on the basis of a determination result transmitted from the fingerprint recognizer 620.

According to the present disclosure, despite using the fingerprint sensor 500 having a large area covering the display area 120, a driving signal may be provided to only a first touch block 1BL corresponding to a position touched by a finger of a user, and thus, a fingerprint of the user may be sensed, thereby decreasing power consumption of the display apparatus. Also, the fingerprint of the user may be sensed based on only sensing signals received from a second touch block 2BL corresponding to the position touched by the finger of the user, thereby decreasing power consumption of the display apparatus.

According to the present disclosure, a fingerprint of a user may be sensed by supplying a driving signal to only a first touch block corresponding to a position touched by a finger of the user, thereby decreasing power consumption of a display apparatus.

Moreover, a fingerprint of a user may be sensed based on only sensing signals received by a second touch block corresponding to a position touched by a finger of the user, thereby decreasing power consumption of the display apparatus.

The above-described feature, structure, and effect of the present disclosure are included in at least one aspect of the present disclosure, but are not limited to only one aspect. Furthermore, the feature, structure, and effect described in at least one aspect of the present disclosure may be implemented through combination or modification of other aspects by those skilled in the art. Therefore, content associated with the combination and modification should be construed as being within the scope of the present disclosure.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A display apparatus including a large-area fingerprint sensor, comprising:
    a display panel displaying an image;
    a touch panel sensing a touch of a finger;
    a fingerprint sensor including a plurality of fingerprint pixels and recognizing a fingerprint of the finger;
    a fingerprint sensor driver driving the fingerprint sensor and including a driver driving the fingerprint sensor and a fingerprint recognizer recognizing a fingerprint by using sensing signals received from the fingerprint sensor;
    a touch driver driving the touch panel,
    wherein the driver provides a sensing gate signal to sensing gate lines included in a first touch block determined to be touched by touch position information received from the touch driver, among m (where m being an integer of 2 or greater) number of sensing gate lines included in the fingerprint sensor;
    wherein the driver comprises:
    a driving signal provider providing driving signals to the fingerprint sensor; and
    a sensing gate signal provider providing sensing gate signals to the m sensing gate lines,
    wherein the sensing gate signal provider provides the sensing gate signal to the sensing gate lines included in the first touch block among the m sensing gate lines.

2. The display apparatus of claim 1, wherein the fingerprint sensor comprises:
    a plurality of receiving electrodes;
    n (where n being an integer of 2 or greater) number of sensing lines connected to fingerprint pixels extending in a first direction among the plurality of fingerprint pixels;
    a driving electrode unit including at least one driving electrode;
    a plurality of fixed voltage lines extending in the first direction;
    a plurality of fingerprint common voltage lines extending in the first direction; and
    one sensing line and first to third transistors included in the fingerprint pixels formed by the one sensing line,
    wherein the m number of sensing gate lines extends in a second direction, and wherein the driver provides the sensing gate signal to the sensing gate lines included in the first touch block among the m number of sensing gate lines.

3. The display apparatus of claim 1, wherein the fingerprint recognizer generates fingerprint information by using sensing signals received through sensing lines included in a second touch block determined being touched based on the touch position information received from the touch driver, among the n sensing lines included in the fingerprint sensor.

4. The display apparatus of claim 1, wherein the sensing gate signal provider comprises:
    a plurality of stages sequentially providing the sensing gate signals to the m sensing gate lines; and
    a stage controller providing a start signal to one of the plurality of stages on the basis of the touch position information transferred from the touch driver to drive one of the plurality of stages.

5. The display apparatus of claim 4, further comprising a reset line disposed between the stage controller and the plurality of stages to receive a reset signal for stopping driving of the plurality of stages.

6. The display apparatus of claim 5, wherein, while a driving signal is being provided to the fingerprint sensor, when an order in which a sensing gate-on signal is to be provided to a kth (where k being an integer of 2 or greater) sensing gate line included in the first touch block arrives, the stage controller provides the start signal to a kth stage.

7. The display apparatus of claim 6, wherein the sensing gate-on signal is provided to a last sensing gate line included in the first touch block, and the sensing controller provides the reset signal to the reset line.

8. The display apparatus of claim 2, wherein the first transistor has a gate connected to the receiving electrode, a first terminal connected to a fixed voltage line and a second terminal connected to a second terminal of the second transistor.

9. The display apparatus of claim 2, wherein the second transistor has a gate connected to the sensing gate line, a first terminal connected to the sensing line and a second terminal connected to the second terminal of the first transistor.

10. The display apparatus of claim 2, wherein the third transistor has a gate connected to another sensing gate line adjacent to the sensing gate line, a first terminal connected to the gate of the first transistor, and a second terminal connected to the fingerprint common voltage line.

11. A display apparatus comprising:
    a touch panel sensing a touch;
    a touch driver driving the touch panel;
    a fingerprint sensor recognizing a fingerprint of a user's finger including a plurality of fingerprint pixels and m number of sensing gate lines and n sensing lines (where m and n being an integer of 2 or greater);
    a fingerprint sensor including a driver driving the fingerprint sensor and a fingerprint recognizer recognizing the fingerprint of the user's finger by using sensing signals received from the fingerprint sensor,
    wherein the driver provides a sensing gate signal to only sensing gate lines included in a first touch block and the fingerprint recognizer generates fingerprint information by using sensing signals received through sensing lines included in a second touch block,
    wherein the driver comprises:
    a driving signal provider providing driving signals to the fingerprint sensor; and
    a sensing gate signal provider providing sensing gate signals to the m sensing gate lines, wherein the sensing gate signal provider provides the sensing gate signal to the sensing gate lines included in the first touch block among the m sensing gate lines.

12. The display apparatus of claim 11, wherein the fingerprint sensor further comprises:
- a plurality of receiving electrodes;
- n (where n being an integer of 2 or greater) number of sensing lines connected to fingerprint pixels extending in a first direction among the plurality of fingerprint pixels;
- a driving electrode unit including at least one driving electrode;
- a plurality of fixed voltage lines extending in the first direction;
- a plurality of fingerprint common voltage lines extending in the first direction; and
- one sensing line and first to third transistors included in the fingerprint pixels formed by the one sensing line, wherein the m number of sensing gate lines extends in a second direction, and wherein the driver provides the sensing gate signal to the sensing gate lines included in the first touch block among the m number of sensing gate lines.

13. The display apparatus of claim 11, wherein the sensing gate signal provider comprises:
- a plurality of stages sequentially providing the sensing gate signals to the m sensing gate lines; and
- a stage controller providing a start signal to one of the plurality of stages on the basis of the touch position information transferred from the touch driver to drive one of the plurality of stages.

14. The display apparatus of claim 13, further comprising a reset line disposed between the stage controller and the plurality of stages to receive a reset signal for stopping driving of the plurality of stages.

15. The display apparatus of claim 14 wherein, while a driving signal is being provided to the fingerprint sensor, when an order in which a sensing gate-on signal is to be provided to a kth (where k being an integer of 2 or greater) sensing gate line included in the first touch block arrives, the stage controller provides the start signal to a kth stage.

16. The display apparatus of claim 15, wherein the sensing gate-on signal is provided to a last sensing gate line included in the first touch block, and the sensing controller provides the reset signal to the reset line.

17. The display apparatus of claim 12, wherein the first transistor has a gate connected to the receiving electrode, a first terminal connected to a fixed voltage line and a second terminal connected to a second terminal of the second transistor, wherein the second transistor has a gate connected to the sensing gate line, a first terminal connected to the sensing line and a second terminal connected to the second terminal of the first transistor, and wherein the third transistor has a gate connected to another sensing gate line adjacent to the sensing gate line, a first terminal connected to the gate of the first transistor, and a second terminal connected to the fingerprint common voltage line.

* * * * *